United States Patent
Fukuta et al.

(10) Patent No.: US 10,390,252 B2
(45) Date of Patent: Aug. 20, 2019

(54) USER TERMINAL, COMMUNICATION METHOD AND APPARATUS

(71) Applicant: KYOCERA CORPORATION, Kyoto (JP)

(72) Inventors: Noriyoshi Fukuta, Inagi (JP); Masato Fujishiro, Yokohama (JP); Akinori Iwabuchi, Machida (JP); Yushi Nagasaka, Ritto (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/811,924

(22) Filed: Nov. 14, 2017

(65) Prior Publication Data
US 2018/0084451 A1 Mar. 22, 2018

Related U.S. Application Data

(63) Continuation of application No. PCT/JP2016/064073, filed on May 12, 2016.
(Continued)

(51) Int. Cl.
*H04W 24/10* (2009.01)
*H04W 88/06* (2009.01)
(Continued)

(52) U.S. Cl.
CPC ............ *H04W 24/10* (2013.01); *H04W 4/70* (2018.02); *H04W 88/06* (2013.01); *H04W 24/02* (2013.01)

(58) Field of Classification Search
CPC ....... H04W 24/10; H04W 4/70; H04W 4/005; H04W 88/06; H04W 24/02
(Continued)

(56) References Cited

U.S. PATENT DOCUMENTS

2005/0111361 A1* 5/2005 Hosein ............... H04J 3/12
370/230
2010/0296449 A1 11/2010 Ishii et al.
(Continued)

FOREIGN PATENT DOCUMENTS

| EP | 1 720 289 A1 | 11/2006 |
| WO | 2009/081871 A1 | 7/2009 |
| WO | 2014/188928 A1 | 11/2014 |

OTHER PUBLICATIONS

InterDigital Communications, On congestion detection, SA WG2 Meeting #95, S2-130389, Jan. 28-Feb. 1, 2013, pp. 1-3, Prague, Czech Republic.*
(Continued)

*Primary Examiner* — Edward F Urban
*Assistant Examiner* — Angelica M Perez
(74) *Attorney, Agent, or Firm* — Studebaker & Brackett PC

(57) ABSTRACT

A user terminal comprises a receiver configured to receive, configuration information configuring measurement for a queuing delay of data packet in an uplink, from a radio base station in a dedicated manner; a controller configured to perform the measurement; and a transmitter configured to report a result of the measurement to the radio base station per unit time. The configuration information includes information indicating length of the unit time and threshold information indicating a threshold related to the queuing delay. The controller is configured to perform the measurement per unit time. The transmitter is configured to report the result of the measurement upon measuring the queuing delay exceeding the threshold within the unit time. The transmitter is configured to not report the result of the measurement upon measuring the queuing delay not exceeding the threshold within the unit time.

6 Claims, 12 Drawing Sheets

Related U.S. Application Data

(60) Provisional application No. 62/275,047, filed on Jan. 5, 2016, provisional application No. 62/232,934, filed on Sep. 25, 2015, provisional application No. 62/162,167, filed on May 15, 2015.

(51) Int. Cl.
*H04W 4/70* (2018.01)
*H04W 24/02* (2009.01)

(58) Field of Classification Search
USPC .................................................. 455/67.11
See application file for complete search history.

(56) References Cited

U.S. PATENT DOCUMENTS

| | | | |
|---|---|---|---|
| 2014/0254398 A1* | 9/2014 | Li | H04W 28/08 370/252 |
| 2015/0263921 A1* | 9/2015 | Lee | H04W 24/10 370/252 |
| 2016/0100378 A1 | 4/2016 | Chang et al. | |
| 2018/0352460 A1* | 12/2018 | Keskitalo | H04L 43/0852 |
| 2019/0007855 A1* | 1/2019 | Lee | H04W 24/10 |

OTHER PUBLICATIONS

Ericsson et al.; Definition of delay sensitive QoS experience-measurement; 3GPP TSG-RAN WG2 #77bis; Tdoc =R2-121601; Mar. 26-30, 2012; pp. 1-2; Jeju, Republic of Korea. (Year: 2012).*

An Office Action issued by the Japanese Patent Office dated Feb. 20, 2018, which corresponds to Japanese Patent Application No. 2017-519156 and is related to U.S. Appl. No. 15/811,924; with English language concise explanation.

International Search Report issued in PCT/JP2016/064073; dated Jul. 19, 2016.

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2; 3GPP TS 37.320 V12.2.0; Sep. 2014; pp. 1-25; Release 12; 3GPP Organizational Partners.

Ericsson et al.; Definition of delay sensitive QoS experience-measurement; 3GPP TSG-RAN WG2 #77bis; Tdoc R2-121601; Mar. 26-30, 2012; pp. 1-2; Jeju, Republic of Korea.

Nokia Siemens Networks et al.; IDC Considerations for MDT; 3GPP TSG-RAN WG2 Meeting #79bis; R2-124423; R2-120056; Oct. 8-12, 2012; pp. 1-2; Bratislava, Slovakia.

3rd Generation Partnership Project; Technical Specification Group Radio Access Network; Evolved Universal Terrestrial Radio Access (E-UTRA) Radio Resource Control (RRC); 3GPP TS 36.331 V8.5. 0; Mar. 2009; total 4 pages; Release 8; 3GPP Organizational Partners.

Kyocera, "Reporting of UL PDCP delay measurements", 3GPP TSG-RAN WG2 #93, R2-161516, St. Julian's, Malta, Feb. 15-19, 2016, total 3 pages.

Kyocera, "Reporting of UL PDCP delay measurements for FeMDT", 3GPP TSG-RAN2 Meeting 93, R2-161517, St. Julian's, Malta, Feb. 15-19, 2016, total 3 pages.

* cited by examiner

USER TERMINAL, COMMUNICATION METHOD AND APPARATUS

RELATED APPLICATIONS

This application is a continuation application of international application PCT/JP2016/064073 (filed May 12, 2016), which claims benefit of U.S. Provisional Application No. 62/162,167 (filed on May 15, 2015), U.S. provisional application No. 62/232,934 (filed on Sep. 25, 2015), and U.S. Provisional Application No. 62/275,047 (filed on Jan. 5, 2016), the entirety of all applications hereby expressly incorporated by reference.

FIELD

The present disclosure relates to a user terminal, a communication method and an apparatus configured to report measurement results of a radio environment to a radio base station.

BACKGROUND

According to 3GPP (3rd Generation Partnership Project) which is a project aiming to standardize a mobile communication system, a specification design of MDT (Minimization of Drive Test) is under way which is a technology in which measurement and collection of a radio environment are automatized by utilizing a user terminal owned by a user (for example, see 3GPP TS 37.320 V12.2.0: "Radio measurement collection for Minimization of Drive Tests (MDT); Overall description; Stage 2", 2014-09).

SUMMARY

A user terminal comprises a receiver configured to receive, configuration information configuring measurement for a queuing delay of data packet in an uplink, from a radio base station in a dedicated manner; a controller configured to perform the measurement; and a transmitter configured to report a result of the measurement to the radio base station per unit time. The configuration information includes information indicating length of the unit time and threshold information indicating a threshold related to the queuing delay. The controller is configured to perform the measurement per unit time. The transmitter is configured to report the result of the measurement upon measuring the queuing delay exceeding the threshold within the unit time. The transmitter is configured to not report the result of the measurement upon measuring the queuing delay not exceeding the threshold within the unit time.

A communication method comprises transmitting in a dedicated manner, from a radio base station to a user terminal, configuration information configuring measurement for a queuing delay of data packet in an uplink; performing the measurement by the user terminal; and reporting, by the user terminal, a result of the measurement to the radio base station per unit time. The configuration information includes information indicating length of the unit time and threshold information indicating a threshold related to the queuing delay. The performing comprising performing the measurement per unit time. The reporting comprises reporting the result of the measurement upon measuring the queuing delay exceeding the threshold within the unit time, and not reporting the result of the measurement upon measuring the queuing delay not exceeding the threshold within the unit time.

DESCRIPTION OF THE EMBODIMENT

Overview of Disclosure

Figure 1:
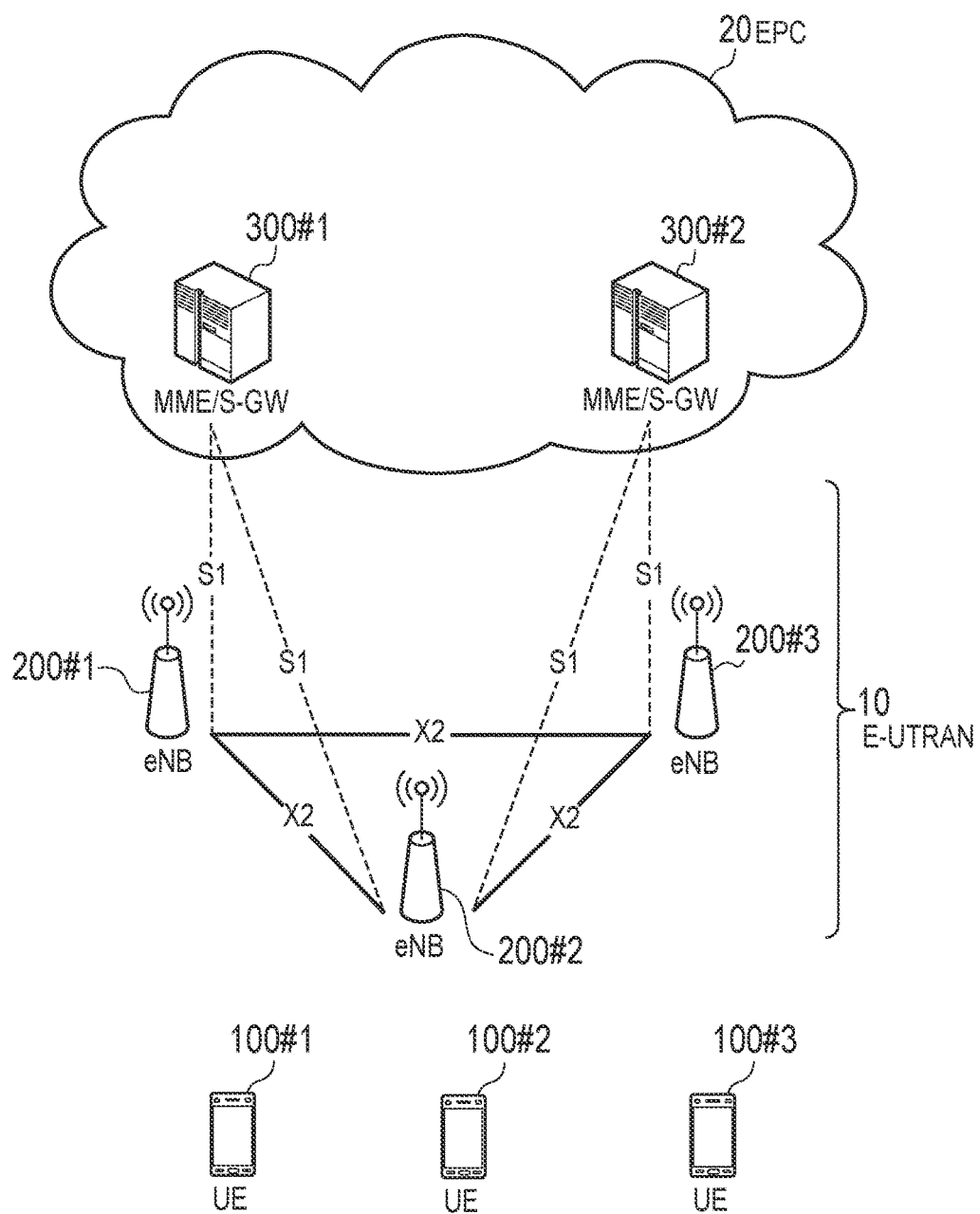
FIG. 1 is a configuration diagram of an LTE system according to a first embodiment.

Firstly, a user terminal according to the overview of disclosure comprise a receiver configured to receive, via a side link for performing D2D communication which is a direct communication with another user terminal, delivery acknowledgment information of data transmitted to the another user terminal; a controller configured to generate a measurement result of quality of service of the side link based on the delivery acknowledgment information; and a transmitter configured to report, via a uplink for performing cellular communication with a radio base station, the measurement result of quality of service, to the radio base station.

In the overview of disclosure, the user terminal reports the measurement result of the service quality of the side link for performing the D2D communication to the radio base station. As a result, it is possible to perform appropriate scheduling using the measurement result of the service quality. For example, it is possible to increase the amount of resources allocated to user terminals that do not satisfy the service quality.

Secondly, a user terminal according to the overview of disclosure comprises a controller configured to generate a measurement result of uplink delay time of data in an uplink for a radio base station, and a transmitter configured to transmit the measurement result of the uplink delay time to the radio base station.

In the overview of disclosure, the user terminal reports the measurement result of the uplink delay time of the data in the uplink for the radio base station to the radio base station. As a result, appropriate scheduling can be performed using the measurement result of the uplink delay time. For example, it is possible to increase the amount of resources to be allocated to user terminals with large uplink delay time.

Thirdly, a user terminal according to the overview of disclosure comprises a controller configured to generate a MDT measurement result including at least location information and store the MDT measurement result in a storage; and a transmitter configured to report the MDT measurement result stored in the storage to a radio base station. The controller stores the MDT measurement result in the storage before an intra-apparatus interference caused by communication other than the cellular communication is detected.

In the overview of disclosure, the user terminal stores the MDT measurement result in the storage before the intra-apparatus interference caused by communication other than the cellular communication is detected. That is, since the MDT measurement result after the intra-apparatus interference is not stored in the storage, storage of the MDT measurement result adversely affected by intra-apparatus interference in the storage is suppressed. Therefore, it is possible to omit the trouble of excluding the MDT measurement result adversely affected by intra-apparatus interference by the upper node such as a radio base station while suppressing the load increase of the user terminal.

First Embodiment

In below, the first embodiment will be described by taking an example of an LTE system based on the 3GPP standard as the mobile communication system.

Configuration of System

The system configuration of the LTE system according to the first embodiment will be described. FIG. 1 is a configuration diagram of the LTE system according to the first embodiment.

As illustrated in FIG. 1, the LTE system according to the first embodiment has an UE (User Equipment) 100, an E-UTRAN (Evolved-UMTS Terrestrial Radio Access Network) 10, and an EPC (Evolved Packet Core) 20.

The UE 100 corresponds to a user terminal. The UE 100 is a mobile communication device, which performs radio communication with a cell formed by a eNB 200 (a serving cell in a case where the UE 100 is in an RRC connected state). The configuration of the UE 100 will be described later.

The E-UTRAN 10 corresponds to a radio access network. The E-UTRAN 10 includes a plurality of eNBs (evolved Node-Bs) 200. The eNB 200 corresponds to a radio base station. The eNB 200 is connected mutually via an X2 interface. The configuration of the eNB 200 will be described later.

The eNB 200 forms one or a plurality of cells, and performs radio communication with the UE 100 which establishes a connection with a cell of the eNB 200. The eNB 200 has a radio resource management (RRM) function, a routing function of user data, a measurement control function for mobility control and scheduling, and the like. The "cell" is used as a term indicating a smallest unit of a radio communication area, and is also used as a term indicating a function of performing radio communication with the UE 100.

The EPC 20 corresponds to a core network. The EPC 20 includes an MME (Mobility Management Entity)/S-GW (Serving-Gateway) 300. The MME performs various types of mobility control and the like for the UE 100. The SGW performs transfer control of the user data. The MME/S-GW 300 is connected to the eNB 200 via an S1 interface. A network of the LTE system is constituted by the E-UTRAN 10 and the EPC 20.

Figure 2:
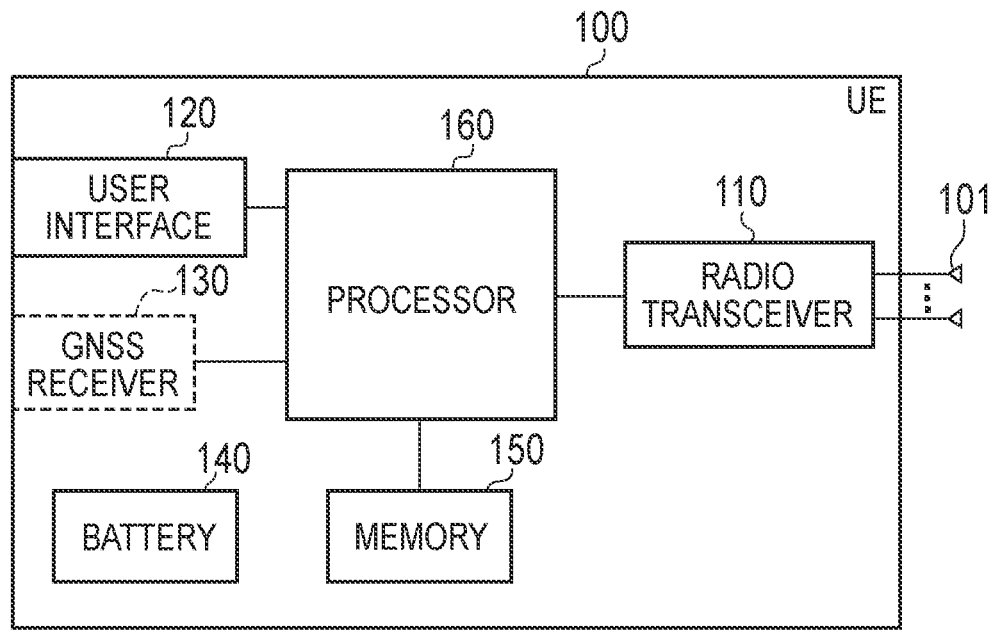
FIG. 2 is a block diagram of a UE 100 according to the first embodiment.

FIG. 2 is a block diagram of the UE 100. As illustrated in FIG. 2, the UE 100 has a plurality of antennas 101, a radio transceiver 110, a user interface 120, a GNSS (Global Navigation Satellite System) receiver 130, a battery 140, a memory 150, and a processor 160. The memory 150 and the processor 160 constitutes a controller. The radio transceiver 110 and the processor 160 constitute a transmitter a receiver. The UE 100 may not include the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (transmission signal) output from the processor 160 into a radio signal, and transmits the radio signal from the antenna 101. Furthermore, the radio transceiver 110 converts a radio signal received by the antenna 101 into a baseband signal (reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver unit 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, coding and decoding, and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
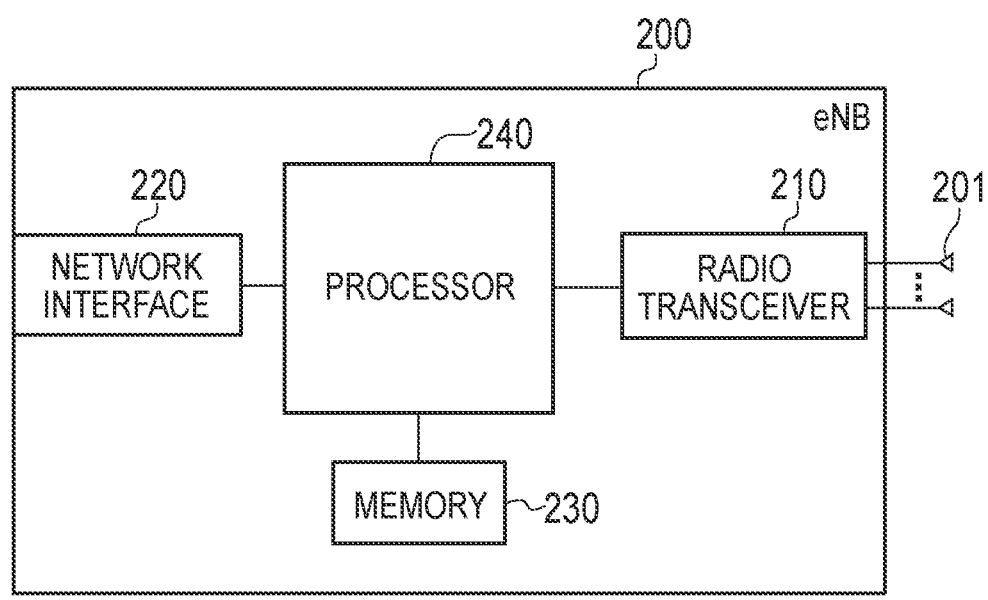
FIG. 3 is a block diagram of an eNB 200 according to the first embodiment.

FIG. 3 is a block diagram of the eNB 200. As illustrated in FIG. 3, the eNB 200 has a plurality of antennas 201, a radio transceiver 210, a network interface 220, a memory 230, and a processor 240. The memory 230 and the processor 240 constitute a controller. The radio transceiver 210 (and/or the network interface 220) and the processor 240 constitute a transmitter a receiver. Furthermore, the memory 230 may be integrally formed with the processor 240, and this set (that is, a chipset) may be called a processor.

The antenna 201 and the radio transceiver 210 are used to transmit and receive the radio signal. The radio transceiver 210 converts a baseband signal (transmission signal) output from the processor 240 into a radio signal, and transmits the radio signal from the antenna 201. Furthermore, the radio transceiver 210 converts a radio signal received by the antenna 201 into a baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes a baseband processor that performs modulation and demodulation, coding and decoding, and the like on the baseband signal, and a CPU that performs various types of processes by executing the program stored in the memory 230. The processor 240 executes various types of processes and various types of communication protocols described later.

Figure 4:
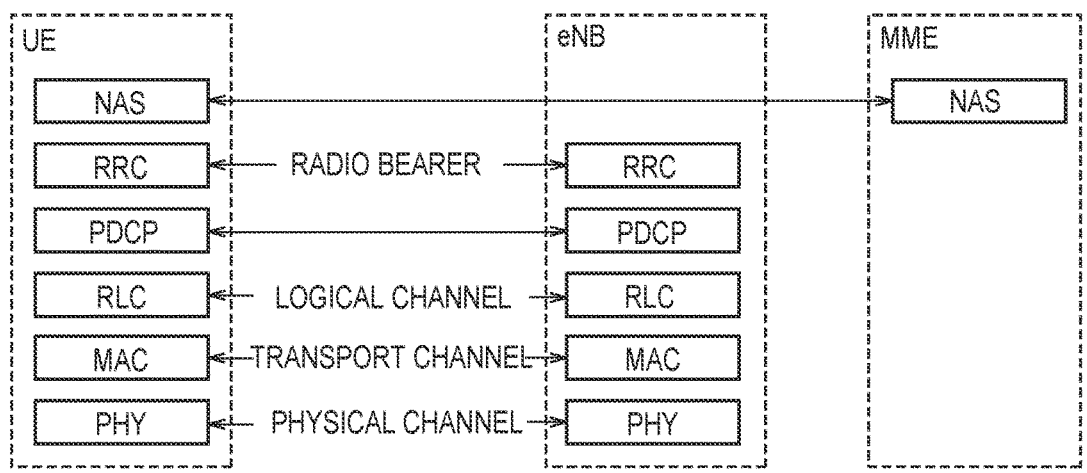
FIG. 4 is a protocol stack diagram of a radio interface according to the first embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control information are sent via a physical channel.

The MAC layer performs priority control of data, a retransmission process by a hybrid ARQ (HARQ) and a random access procedure and the like. Between the MAC layer of the UE 100 and the MAC layer of the eNB 200, user data and control information are sent via a transport channel. The MAC layer of the eNB 200 includes a scheduler for deciding a transport format (a transport block size and a modulation and coding scheme (MCS)) of an uplink and a downlink, and a resource block to be allocated to the UE 100.

The RLC layer sends data to an RLC layer of a reception side by using the functions of the MAC layer and the physical layer. Between the RLC layer of the UE 100 and the RLC layer of the eNB 200, user data and control information are sent via a logical channel.

The PDCP layer performs header compression and decompression, and encryption and decryption. It should also be noted that a transmitting entity for transmitting a data unit (PDCP PDU) or a receiving entity for receiving a data unit is formed in the PDCP layer.

The RRC layer is defined only in a control plane that handles control information. Between the RRC layer of the UE 100 and the RRC layer of the eNB 200, control information (an RRC message) for various types of configurations is sent. The RRC layer controls a logical channel, a transport channel, and a physical channel according to the establishment, re-establishment, and release of a radio bearer. When there is a connection (RRC connection) between the RRC of the UE 100 and the RRC of the eNB 200, the UE 100 is in an RRC connected state. When there is not a connection (RRC connection) between the RRC of the UE 100 and the RRC of the eNB 200, the UE 100 is in an RRC idle state.

An NAS (Non-Access Stratum) layer positioned above the RRC layer performs session management, mobility management, and the like.

Figure 5:
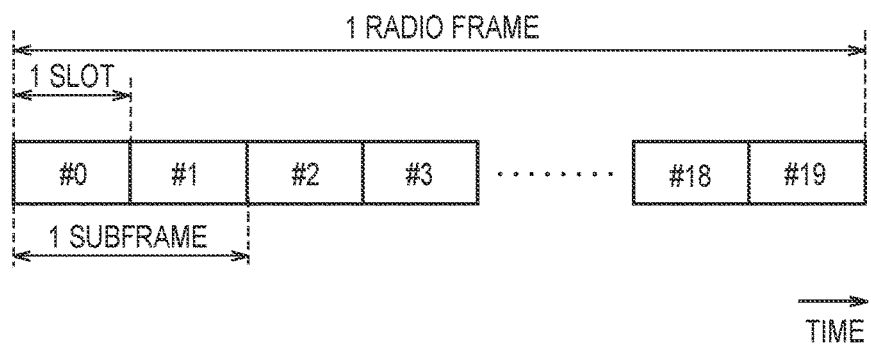
FIG. 5 is a configuration diagram of a radio frame used in the LTE system according to the first embodiment.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is constituted by one subcarrier and one symbol. Of the radio resources (time frequency resources) allocated to the UE 100, a frequency resource is identified by a resource block, and a time resource is identified by a subframe (or a slot).

Application Scene

Figure 6:
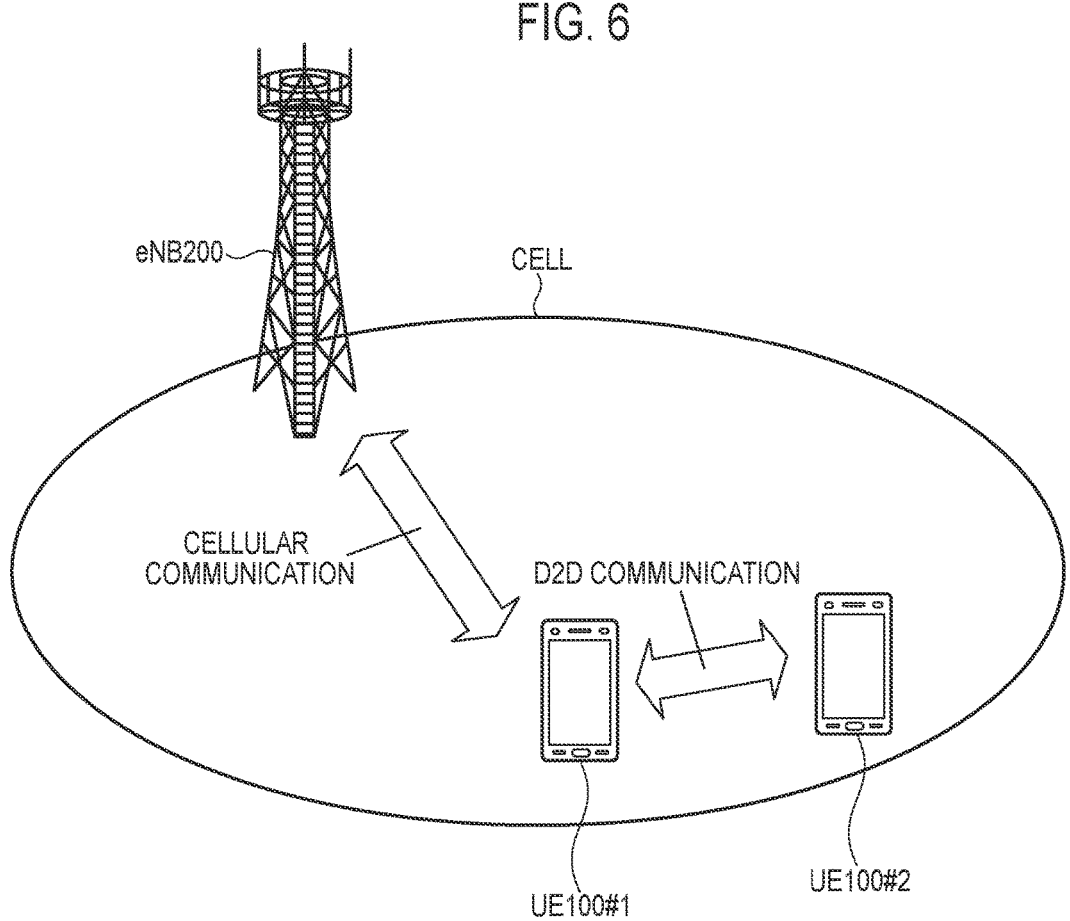
FIG. 6 is a diagram for describing an application scene according to the first embodiment.

An application scene will be described below. FIG. 6 is a diagram for describing an application scene according to the first embodiment.

As illustrated in FIG. 6, in the application scene, a case in which at least a UE 100 #1 exists in a cell that the eNB 200 has is assumed. In such a case, the UE 100 #1 and the eNB 200 perform cellular communication, and the UE 100 #1 and a UE 100 #2 perform D2D communication which is direct communication between UEs.

The UE 100 #2 may be located in a cell that the eNB 200 has (In-Coverage). Alternatively, the UE 100 #2 may not be located in a cell that the eNB 200 has (Out-of-Coverage).

However, a radio resource used for the D2D communication between the UE 100 #1 and the UE 100 #2 is designated by the eNB 200. Specifically, the eNB 200 transmits, to the UE 100 #1, a message (DCI; Downlink Control Information) containing allocation information of a radio resource used for the D2D communication. Such a message may be called "DCI Format 5".

Under such a prerequisite, the UE 100 #1 (receiver) receives, from the UE 100 #2, delivery acknowledgment information of data transmitted to the UE 100 #2, via a side link for performing the D2D communication. The UE 100 #1 (controller) generates the measurement results of the service quality of the side link based on the delivery acknowledgment information. The UE 100 #1 (transmitter) reports, to the eNB 200, the measurement results of the service quality, via the uplink for performing cellular communication with the eNB 200.

The measurement results of the service quality include one or more data selected from among a data amount lost in the side link (hereinafter referred to as "side link data loss"), a throughput of an IP (Internet Protocol) layer in the side link (hereinafter referred to as "side link IP throughput"), and a data amount successfully received by the UE 100 #2 (hereinafter referred to as "side link data amount").

The side link data loss can be calculated by the expression shown below, for example.

$$M(T, qci) = \left\lfloor \frac{Dloss(T, qci) * 1000000}{Nloss(T, qci)} \right\rfloor \qquad \text{[Math. 1]}$$

In the expression, M (T, qci) is a value indicating a loss of a packet for each QCI (QoS Class Identifier) in the side link. Dloss (T, qci) is the number of PDCP (Packet Data Convergence Protocol) packets lost in the side link, and indicates the number of PDCP packets with QCI=qci that are not led to an upper layer in a time T. Nloss (T, qci) is the total number of PDCP (Packet Data Convergence Protocol) packets transmitted in the side link, and indicates the number of PDCP packets with QCI=qci in the time T. T indicates a period during which a measurement of the side link data loss is performed.

The side link IP throughput can be, for example, calculated by the expressions shown below.

$$\text{If} \sum ThpTimeSI > 0, \; \frac{\sum ThpVolSI}{\sum ThpTimeSI} \times 1000 \; \text{[kbits/s]} \quad \text{[Math. 2]}$$

$$\text{If} \sum ThpTimeSI = 0, \; 0 \; \text{[kbits/s]}$$

In the expressions, if a data amount can be sufficiently transmitted in a single TTI, then ThpTimeSI is a parameter in which "0" is set, and otherwise, ThpTimeSI is a parameter in which "T1-T2" is set. If the data continues at the end of the measurement period, then T1 is a parameter in which the end time of the measurement period is set, and otherwise, T1 is a parameter in which the end time of the last TT1 used for data transmission of TTIs included in the measurement period is set. If the data continues at the beginning of the measurement period, then T2 is a parameter in which the start time of the measurement period is set, and otherwise, T2 is a parameter in which the start time of the first TT1 used for data transmission of TTIs included in the measurement period is set. ThpVolIP is a value obtained by subtracting a data amount received in the last TTI used for data transmission from an SDU (unit=kbits) of a PDCP layer received in the side link.

The side link data amount is the number of bits of the SDU of the PDCP layer that the UE 100 #2 is successful in receiving in the measurement period.

Here, a case of utilizing (A) Immediate MDT and a case of utilizing (B) Logged MDT in Connected are assumed for a timing of reporting the measurement results of the service quality to the eNB 200.

(A) Immediate MDT

In the Immediate MDT, a UE 100 being in the connected state receives measurement configuration information (RRM Measurement Configuration) from the eNB 200, and stores various types of measurement configuration parameters included in the measurement configuration information. The measurement configuration parameter includes a report trigger that is a trigger for reporting the measurement results of the service quality. The UE 100, in response to occurrence of an event corresponding to the report trigger, generates the measurement results of the service quality, and at the same time, reports the measurement results of the service quality to the eNB 200.

Specifically, the UE 100 #1 described above reports the measurement results of the service quality to the eNB 200 at the timing of generation of the measurement results of the service quality. Alternatively, the UE 100 #1 may report the measurement results of the service quality that fall below a predetermined threshold value, to the eNB 200, at a timing of generation of the measurement results of the service quality that fall below the predetermined threshold value.

The predetermined threshold value is preferably included in the measurement configuration information. The predetermined threshold value may be a value that is defined beforehand. The measurement results of the service quality preferably include the location information of the UE 100.

(B) Logged MDT in Connected

In the Logged MDT in Connected, a UE 100 being in the connected state receives measurement configuration information (Logged Measurement Configuration) from the eNB 200, and stores various types of MDT configuration parameters included in the measurement configuration information. The MDT configuration parameter includes a generation trigger that is a trigger for generating the measurement results of the service quality. The UE 100, in response to occurrence of an event corresponding to the generation trigger, stores (logs) the measurement results of the service quality in a storage unit. The UE 100, in response to a report request received from the eNB 200, reports the measurement results of the service quality stored in the storage unit to the eNB 200.

Specifically, the UE 100 #1 described above stores the measurement results of the service quality in the storage unit. The UE 100 #1 described above reports the measurement results of the service quality stored in the storage unit, to the eNB 200, at a timing of reception of the report request from the eNB 200. Alternatively, the UE 100 #1 reports the measurement results of the service quality that fall below a predetermined threshold value from among the measurement results of the service quality stored in the storage unit, to the eNB 200, at a timing of reception of the report request from the eNB 200. Here, the UE 100 #1 may be configured to store, in the storage unit, only the measurement results of the service quality that fall below the predetermined threshold value.

The predetermined threshold value is preferably included in the measurement configuration information. The predetermined threshold value may be a value that is defined beforehand. The measurement results of the service quality preferably include the location information of the UE 100.

In the Logged MDT in Connected, if transiting from the RRC idle state to the RRC connected state, the UE 100 may notify the eNB 200 of information (Available Indication) indicating that the measurement results of the service quality are stored in the storage unit. Alternatively, if performing a handover from a source eNB 200 to a target eNB 200, the UE 100 may transmit information (Available Indication) indicating that the measurement results of the service quality are stored in the storage unit, to the target eNB 200. In such a case, the eNB 200, in response to the information (Available Indication) indicating that the measurement results of the service quality are stored in the storage unit, transmits a report request for the measurement results of the service quality, to the UE 100.

Alternatively, the eNB 200 may receive, from the UE 100, a buffer status report (BSR) indicating the state of the buffer of the UE 100 used in the D2D communication, and the same time, determine whether or not there is data to be transmitted in the D2D communication, based on the buffer status report. If there is no data to be transmitted in the D2D communication, the eNB 200 determines that the D2D communication has ended, and transmits, to the UE 100, a report request for the measurement results of the service quality.

Mobile Communication Method

Figure 7:
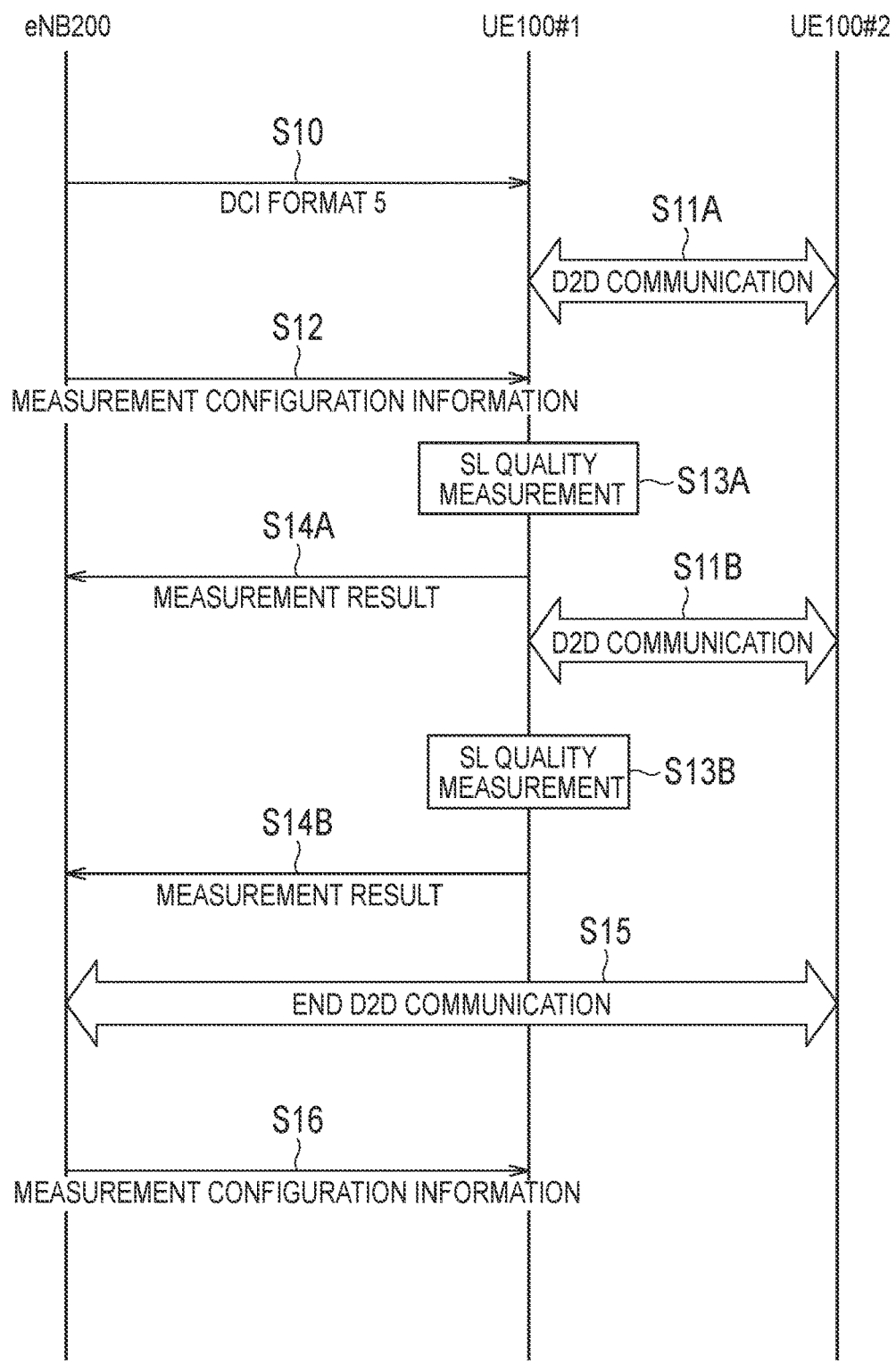
FIG. 7 is a sequence diagram illustrating a mobile communication method according to the first embodiment.
Figure 8:
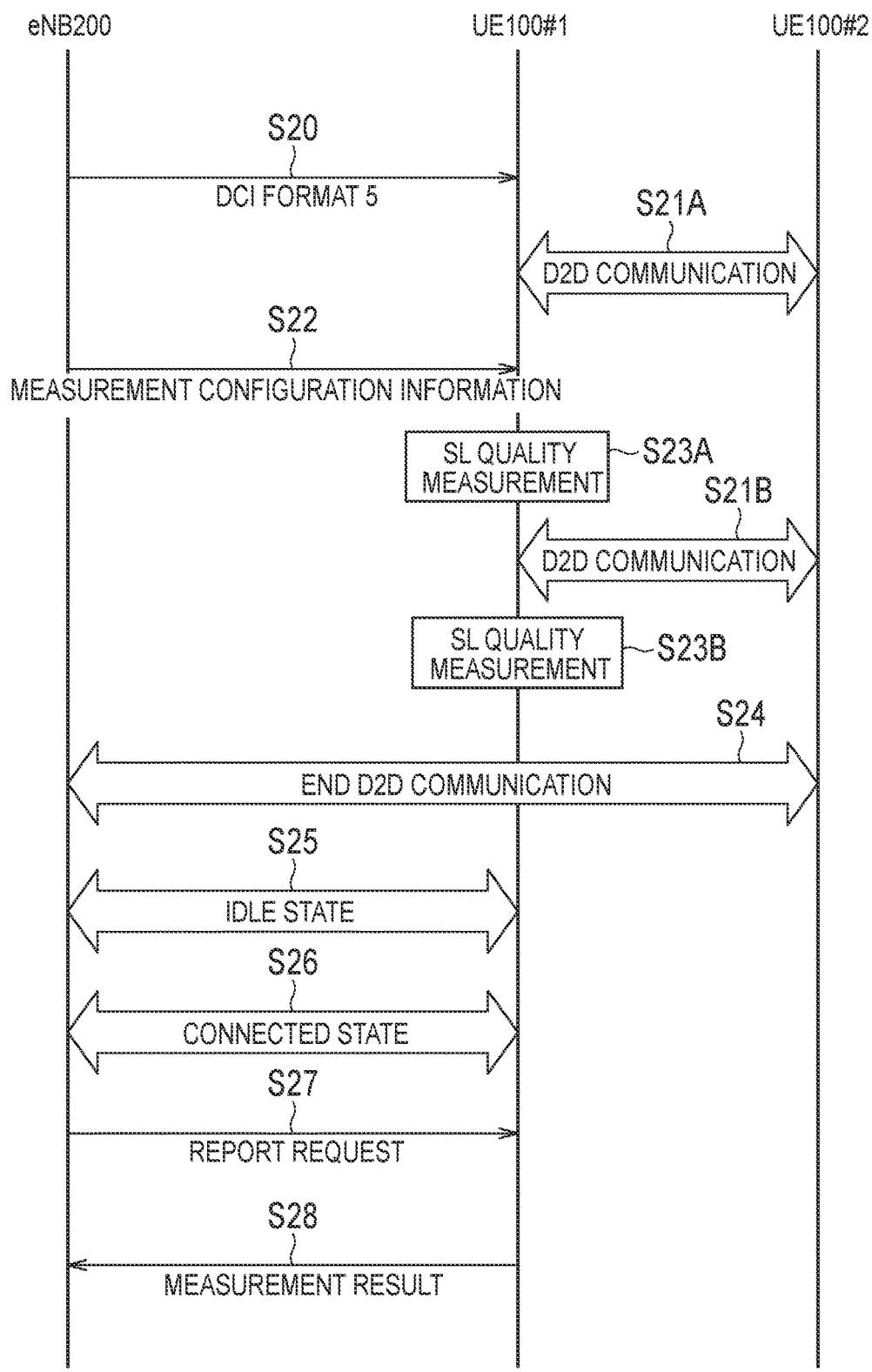
FIG. 8 is a sequence diagram illustrating a mobile communication method according to the first embodiment.

A mobile communication method according to the first embodiment will be described below. FIG. 7 and FIG. 8 are sequence diagrams illustrating the mobile communication method according to the first embodiment. Here, a case in which the UE 100 #1 and the eNB 200 perform cellular communication, and the UE 100 #1 and the UE 100 #2 perform D2D communication will be illustrated. Here, mainly, a case in which data is transmitted from the UE 100

1 to the UE 100 #2, and delivery acknowledgment information is transmitted from the UE 100 #2 to the UE 100 #1 will be described.

Firstly, Immediate MDT will be described with reference to FIG. 7.

As shown in FIG. 7, in step S10, the eNB 200 transmits, to the UE 100 #1, a message (DCI Format 5) for designating a radio resource used in the D2D communication between the UE 100 #1 and the UE 100 #2.

In step S11A or step S11B, the UE 100 #1 and the UE 100 #2 perform the D2D communication by using the radio resource designated by the eNB 200.

In step S12, the eNB 200 transmits measurement configuration information to the UE 100 #1. Various types of measurement configuration parameters included in the measurement configuration information are stored. The measurement configuration parameter includes a report trigger that is a trigger for reporting the measurement results of the service quality. In step S12, the measurement configuration information includes information for requesting measurement of the service quality of the side link. The measurement configuration information may be included in the RRM Measurement Configuration.

In step S13A or step S13B, the UE 100 #1 measures the service quality of the side link, based on delivery acknowledgment information received from the UE 100 #2.

In step S14A or step S14B, the UE 100 #1, in response to occurrence of an event corresponding to the report trigger, generates the measurement results of the service quality. The UE 100 #1 may report the measurement results of the service quality to the eNB 200 at a timing of generation of the measurement results of the service quality. Alternatively, the UE 100 #1 may report the measurement results of the service quality that fall below a predetermined threshold value, to the eNB 200, at a timing of generation of the measurement results of the service quality that fall below the predetermined threshold value.

In step S15, the UE 100 #1 and the UE 100 #2 end the D2D communication.

In step S16, the eNB 200 transmits the measurement configuration information to the UE 100 #1. In step S16, the measurement configuration information does not include information for requesting measurement and reporting of the service quality of the side link. Alternatively, the measurement configuration information may include information for canceling measurement and reporting of the service quality of the side link.

Secondly, Logged MDT in Connected will be described with reference to FIG. 8.

As illustrated in FIG. 8, in step S20, the eNB 200 transmits, to the UE 100 #1, a message (DCI Format 5) for designating the radio resource used in the D2D communication between the UE 100 #1 and the UE 100 #2.

In step S21A or step S21B, the UE 100 #1 and the UE 100 #2 perform the D2D communication by using a radio resource designated by the eNB 200.

In step S22, the eNB 200 transmits the measurement configuration information to the UE 100 #1. Various types of measurement configuration parameters included in the measurement configuration information are stored. The measurement configuration parameter includes a generation trigger that is a trigger for generating the measurement results of the service quality. In step S22, the measurement configuration information includes information for requesting measurement and reporting of the service quality of the side link. The measurement configuration information may be included in the RRM Measurement Configuration.

In step S23A or step S23B, the UE 100 #1 measures the service quality of the side link based on the delivery acknowledgment information received from the UE 100 #2. The UE 100 #1, in response to occurrence of an event corresponding to the generation trigger, stores (logs) the measurement results of the service quality in the storage unit. Here, the UE 100 #1 may store only the measurement results of the service quality that fall below the predetermined threshold value.

In step S24, the UE 100 #1 and the UE 100 #2 end the D2D communication.

In step S25, the UE 100 #1 transits from the connected state to an idle state.

In step S26, the UE 100 #1 transits from the idle state to the connected state.

In step S27, the eNB 200 transmits the report request for the measurement results of the service quality to the UE 100 #1. As described above, the eNB 200 may, in response to the information (Available Indication) notified from the UE 100 #1, transmit the report request for the measurement results of the service quality to the UE 100 #1, or may, in response to the information (BSR of the D2D communication) notified from the UE 100 #1, transmit the report request for the measurement results of the service quality to the UE 100 #1.

In step S28, the UE 100 #1 reports the measurement results of the service quality stored in the storage unit, to the eNB 200, at a timing of reception of the report request from the eNB 200. Alternatively, the UE 100 #1 may report the measurement results of the service quality that fall below a predetermined threshold value from among the measurement results of the service quality stored in the storage unit, to the eNB 200, at a timing of reception of the report request from the eNB 200.

In the first embodiment described above, a case in which the UE 100 #1 (data transmission side/delivery acknowledgment information reception side) reports the measurement results of the service quality to the eNB 200 will be mainly described. However, the UE 100 #2 (data reception side/delivery acknowledgment information transmission side) may report the measurement results of the service quality to the eNB 200. In such a case, in step S12 or step S22, the eNB 200 may transmit the measurement configuration information to the UE 100 #2.

Operation and Effect

In the first embodiment, the UE 100 reports the measurement results of the service quality of the side link for performing the D2D communication, to the eNB 200. As a result, it is possible to perform appropriate scheduling by using the measurement results of the service quality. For example, the amount of resources allocated to a UE 100 that does not satisfy the service quality can be increased.

First Modification

A first modification of the first embodiment will be described below. Differences from the first embodiment are mainly described below.

Specifically, in the first embodiment, the procedure of reporting the measurement results of the service quality in MDT is described. In contrast, in the first modification, a procedure of reporting the measurement results of an uplink delay time of data in the uplink to the eNB 200 in MDT will be described. Here, the uplink delay time is a delay time from generation of data to be transmitted in the uplink by a UE 100 up to reception of the data at a reception side (eNB 200), or a delay time (UL queuing delay) from generation of data to be transmitted in the uplink by a UE 100 up to the notification that the data is received at a reception side (eNB 200).

In particular, the UE 100 (controller) generates the measurement results of the uplink delay time of the data in the uplink to the eNB 200. The UE 100 (transmitter) reports the measurement results of the uplink delay time to the eNB 200.

Here, similarly to the first embodiment, a case of utilizing (A) Immediate MDT and a case of utilizing (B) Logged MDT in Connected are assumed for a timing of reporting the measurement results of the uplink delay time to the eNB 200.

(A) Immediate MDT

In the Immediate MDT, a UE 100 being in the connected state receives measurement configuration information (RRM Measurement Configuration) from the eNB 200, and stores various types of measurement configuration parameters included in the measurement configuration information. The measurement configuration parameter includes a report trigger that is a trigger for reporting the measurement results of the uplink delay time. The UE 100, in response to occurrence of an event corresponding to the report trigger, generates the measurement results of the uplink delay time, and at the same time, reports the measurement results of the uplink delay time to the eNB 200.

Specifically, the UE 100 reports the measurement results of the uplink delay time to the eNB 200 at a timing of the generation of the measurement results of the uplink delay time. Alternatively, the UE 100 may report the measurement results of the uplink delay time that exceed a predetermined threshold value, to the eNB 200, at a timing of the generation of the measurement results of the uplink delay time that exceed the predetermined threshold value.

The predetermined threshold value is preferably included in the measurement configuration information. The predetermined threshold value may be a value that is defined beforehand. The measurement results of the uplink delay time preferably include the location information of the UE 100.

(B) Logged MDT in Connected

In the Logged MDT in Connected, a UE 100 being in the connected state receives measurement configuration information (Logged Measurement Configuration) from the eNB 200, and stores various types of MDT configuration parameters included in the measurement configuration information. The MDT configuration parameter includes a generation trigger that is a trigger for generating the measurement results of the uplink delay time. The UE 100, upon occurrence of an event corresponding to the generation trigger, stores (logs) the measurement results of the uplink delay time in the storage unit. The UE 100, in response to a report request received from the eNB 200, reports the measurement results of the uplink delay time stored in the storage unit to the eNB 200.

Specifically, the UE 100 stores the measurement results of the uplink delay time in the storage unit. The UE 100 reports the measurement results of the uplink delay time stored in the storage unit, to the eNB 200, at a timing of reception of the report request from the eNB 200. Alternatively, the UE 100 reports the measurement results of the uplink delay time that exceed a predetermined threshold value from among the measurement results of the uplink delay time stored in the storage unit, to the eNB 200, at a timing of reception of the report request from the eNB 200. Here, the UE 100 may be configured to store only the measurement results of the uplink delay time that exceed the predetermined threshold value in the storage unit.

The predetermined threshold value is preferably included in the measurement configuration information. The predetermined threshold value may be a value that is defined beforehand. The measurement results of the uplink delay time preferably include the location information of the UE 100.

In the Logged MDT in Connected, when transiting from the RRC idle state to the RRC connected state, the UE 100 may notify the eNB 200 of information (Available Indication) indicating that the measurement results of the uplink delay time are stored in the storage unit. Alternatively, when performing a handover from a source eNB 200 to a target eNB 200, the UE 100 may transmit, to the target eNB 200, information (Available Indication) indicating that the measurement results of the uplink delay time are stored in the storage unit. In such a case, the eNB 200, in response to the information (Available Indication) indicating that the measurement results of the uplink delay time are stored in the storage unit, transmits a report request for the measurement results of the uplink delay time, to the UE 100.

Mobile Communication Method

Figure 9:
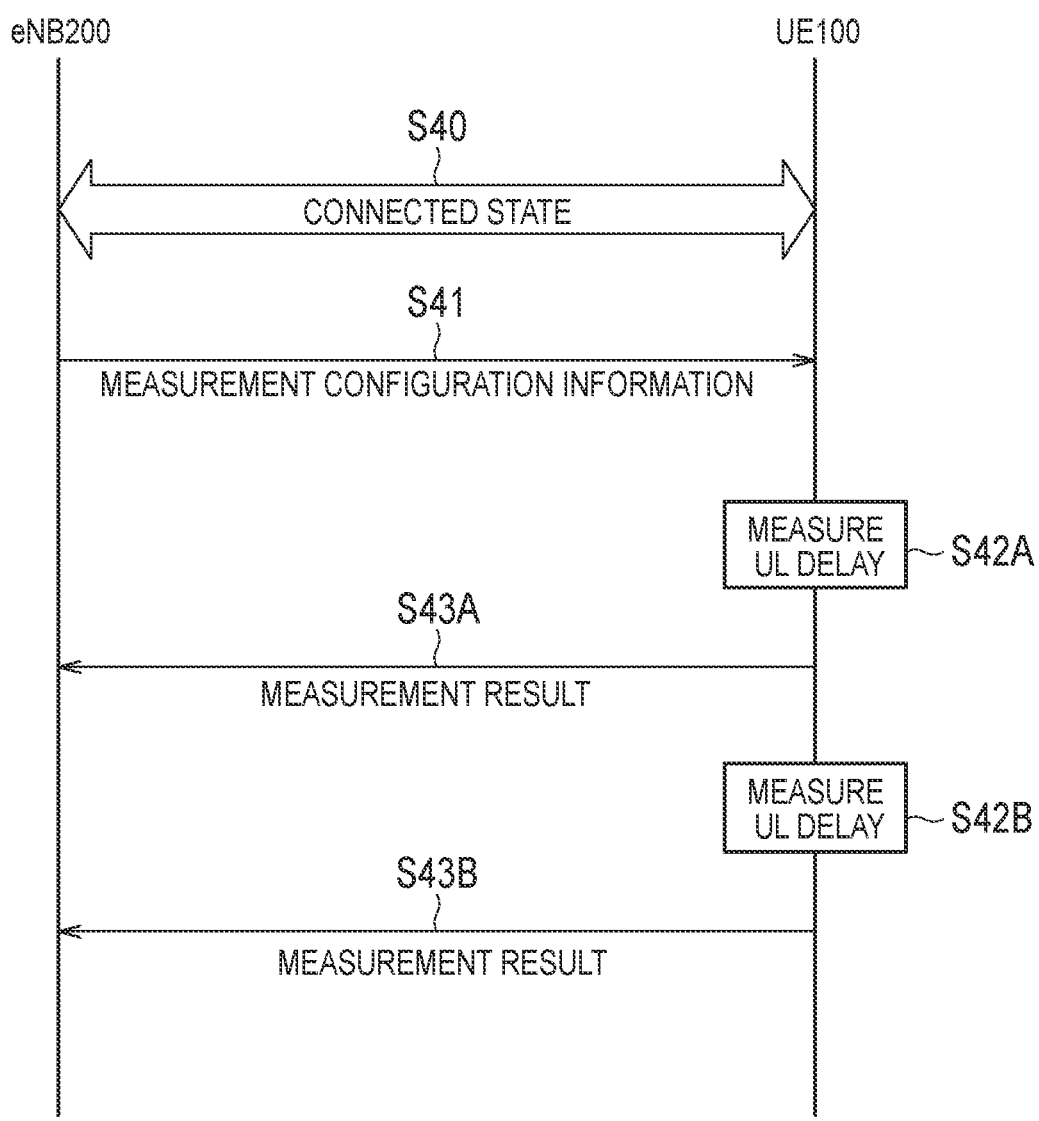
FIG. 9 is a sequence diagram illustrating a mobile communication method according to a first modification.
Figure 10:
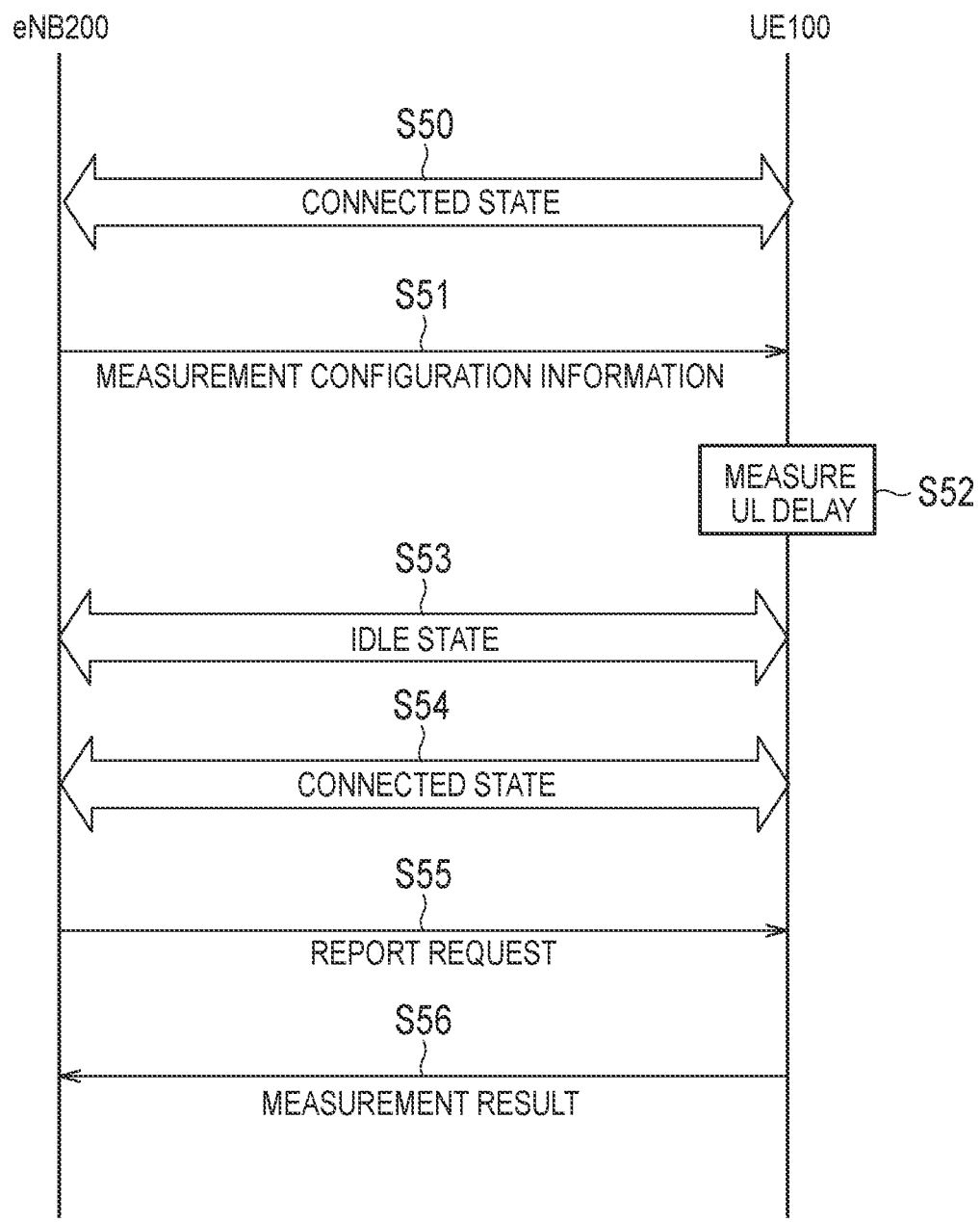
FIG. 10 is a sequence diagram illustrating a mobile communication method according to the first modification.

Hereinafter, a mobile communication method according to the first modification will be described. FIG. 9 and FIG. 10 are sequence diagrams illustrating the mobile communication method according to the first modification.

Firstly, Immediate MDT will be described with reference to FIG. 9.

As illustrated in FIG. 9, in step S40, the UE 100 is in an RRC connected state.

In step S41, the eNB 200 transmits the measurement configuration information to the UE 100. Various types of measurement configuration parameters included in the measurement configuration information are stored. The measurement configuration parameter includes a report trigger that is a trigger for reporting the measurement results of the uplink delay time. The measurement configuration information may be included in the RRM Measurement Configuration.

In step S42A or step S42B, the UE 100 measures the service quality of the uplink delay time.

In step S43A or step S43B, the UE 100, in response to occurrence of an event corresponding to the report trigger, generates the measurement results of the uplink delay time. The UE 100 reports the measurement results of the uplink delay time to the eNB 200 at a timing of generation of the measurement results of the uplink delay time. Alternatively, the UE 100 may report the measurement results of the uplink delay time that exceed a predetermined threshold value, to the eNB 200, at a timing of the generation of the measurement results of the uplink delay time that exceed the predetermined threshold value.

As illustrated in FIG. 10, in step S50, the UE 100 is in an RRC connected state.

In step S51, the eNB 200 transmits the measurement configuration information to the UE 100. Various types of measurement configuration parameters included in the measurement configuration information are stored. The measurement configuration parameter includes a generation trigger that is a trigger for generating the measurement results of the uplink delay time. The measurement configuration information may be included in the RRM Measurement Configuration.

In step S52, the UE 100 measures the service quality of the uplink delay time. The UE 100, in response to occurrence of an event corresponding to the generation trigger, stores (logs) the measurement results of the uplink delay time in the storage unit. Here, the UE 100 may store only the measurement results of the uplink delay time that exceed the predetermined threshold value in the storage unit.

In step S53, the UE 100 transits from the connected state to an idle state.

In step S54, the UE 100 transits from the idle state to the connected state.

In step S55, the eNB 200 transmits a report request for the measurement results of the uplink delay time to the UE 100. As described above, the eNB 200, in response to the information (Available Indication) notified from the UE 100, transmits the report request for the measurement results of the uplink delay time, to the UE 100.

In step S56, the UE 100 reports the measurement results of the uplink delay time stored in the storage unit, to the eNB 200, at a timing of reception of the report request from the eNB 200. Alternatively, the UE 100 may report the measurement results of the uplink delay time that exceed a predetermined threshold value from among the measurement results of the uplink delay time stored in the storage unit, to the eNB 200, at a timing of reception of the report request from the eNB 200.

In the first modification described above, the UE 100 reports information (hereinafter referred to as "report information") for estimating the dispersion in the measurement results of the uplink delay time, to the eNB 200. The report information may include the average uplink delay time, the bottom 5% of the uplink delay time, and the top 5% of the uplink delay time.

Operation and Effect

In the first modification, the UE 100 reports, to the eNB 200, the measurement results of the uplink delay time of data in the uplink to the eNB 200. As a result, it is possible to perform appropriate scheduling by using the measurement results of the uplink delay time. For example, the amount of resources allocated to a UE 100 having a long uplink delay time can be increased.

Second Modification

A second modification of the first embodiment will be described below. Differences from the first embodiment are mainly described below.

Specifically, in the first embodiment, the procedure of reporting the measurement results of the service quality in MDT is described. In contrast, in the second modification, a procedure of reporting the MDT measurement results including at least the location information in MDT will be described. The MDT measurement results are same as the contents reported in the conventional MDT, and may include at least the location information indicating the geographical location of the UE 100. The MDT measurement results may include the reception quality (RSRP and RSRQ) of a signal received by cellular communication from the eNB 200.

In particular, the UE 100 is a dual terminal having a function of performing communication other than the cellular communication (such as WiFi and BlueTooth), in addition to the function of performing the cellular communication. Further, in the second modification, a case in which the MDT measurement results are reported by Logged MDT in Idle will be mainly assumed.

Here, at Phase 0, the UE 100 starts communication other than the cellular communication (such as WiFi and BlueTooth), in addition to the cellular communication. That is, in the UE 100, a state (IDC; In Device Coexistence) occurs in which the cellular communication and communication other than the cellular communication are performed simultaneously. The above-described in-device interference is interference that occurs as a result of IDC.

At Phase 1, the UE 100 detects an in-device interference. Specifically, the UE 100 detects that the in-device interference exceeds a predetermined threshold value (the start timing of Phase 1 illustrated in FIG. 11).

Figure 11:
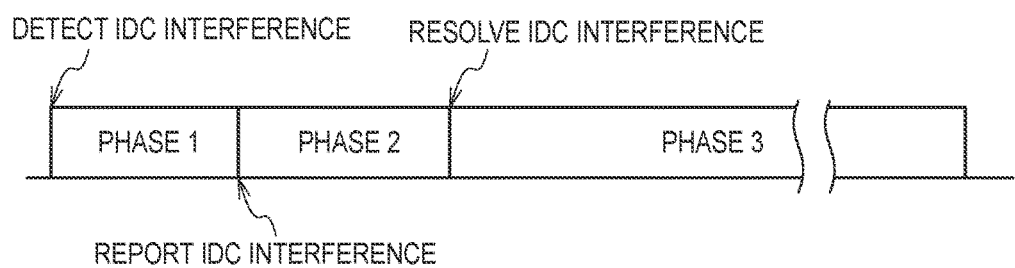
FIG. 11 is a diagram for describing an in-device interference according to a second modification.

At Phase 2, the UE 100 reports, to the eNB 200, an indication indicating that the in-device interference occurs (the start timing of Phase 2 illustrated in FIG. 11).

At Phase 3, the eNB 200 executes a procedure for resolving the in-device interference. For example, the eNB 200 performs a change in the frequency (FDM Solution) and a change in a scheduling timing of the cellular communication (TDM Solution) (the start timing of Phase 3 illustrated in FIG. 11).

It should be noted that Phases 1 through 3 illustrated in FIG. 11 and the procedure for resolving the in-device interference are described in 23.4.2 of the existing 3GPP standard TS36.300 V.12.5.0.

In such a case, the UE 100 (controller) generates the MDT measurement results including at least the location information, and at the same time, stores the MDT measurement results in the storage unit. The UE 100 (transmitter) reports the MDT measurement results stored in the storage unit to the eNB 200. In such a case, before detecting the in-device interference that occurs as a result of communication other than the cellular communication, the UE 100 (controller) stores the MDT measurement results in the storage unit. That is, the UE 100 stores the MDT measurement results prior to Phase 1 illustrated in FIG. 11 in the storage unit. In other words, the UE 100 does not store the MDT measurement results after Phase 1 illustrated in FIG. 11 in the storage unit.

In the second modification, the UE 100 (controller) preferably discards the MDT measurement results stored in the storage unit after starting communication other than the cellular communication. That is, the UE 100 discards the MDT measurement results stored in the storage unit after starting communication other than the cellular communication even in a phase prior to Phase 1 illustrated in FIG. 11. The UE 100 may, in response to the start of communication other than the cellular communication, stop storing the MDT measurement results in the storage unit.

Alternatively, the UE 100 (controller) maintains configuration information for storing the MDT measurement results even if an in-device interference is detected, and at the same time, the UE 100 preferably resumes storing the MDT measurement results in the storage unit according to the configuration information if the in-device interference is resolved. That is, in Phase 3 and thereafter illustrated in FIG. 11, the UE 100 resumes storing the MDT measurement results in the storage unit.

Operation and Effect

The UE 100 according to the third modification stores the MDT measurement results in the storage unit before detecting the in-device interference that occurs as a result of communication other than the cellular communication. That is, since the MDT measurement results after detecting the in-device interference are not stored in the storage unit, storing the MDT measurement results adversely affected by the in-device interference into the storage unit is prevented. Therefore, while increase in load on the UE 100 is prevented, the time and effort for excluding the MDT measurement results t adversely affected by the in-device interference by an upper node such as the eNB 200, etc. can be saved.

Second Embodiment

When the UE 100 (the processor 160) does not detect a queuing delay of an uplink PDCP (when the UE 100 does not detect a spike, or when the delay rate of PDCP queuing is below a threshold value), the UE 100 may not create the measurement results of the uplink PDCP queuing delay (ul-PDCP-DelayResult) for reporting to the eNB 200 (the UE 100 may also restrict the creation of the measurement results of PDCP queuing delay). It is noted that the spike is a state in which the queuing delay of a few packets of the PDCP packets within a unit time suddenly exceeds a threshold value. Further, the delay rate of PDCP queuing is the rate of PDCP packets in which the queuing delay exceeds a threshold value, from among the PDCP packets within a unit time.

Further, even if the UE 100 detects no queuing delays of the uplink PDCP, the UE 100 may create the measurement results of the uplink PDCP queuing delay (ul-PDCP-DelayResult) (excessDelay included in the measurement results is created as 0).

Further, if the delay ratio of PDCP queuing is below a threshold value (0 or more) even if the UE 100 detects a queuing delay of the uplink PDCP, the UE 100 may not create the measurement results of the uplink PDCP queuing delay (ul-PDCP-DelayResult) for reporting to the eNB 200.

If the measurement results of the uplink PDCP queuing delay are not created, the UE 100 may not report the measurement results of the uplink PDCP queuing delay to the eNB 200.

Other Embodiments

The present disclosure is explained through the above-described embodiments, but it must not be understood that this disclosure is limited by the statements and the drawings constituting a part of this disclosure. From this disclosure, various alternative embodiments, examples, and operational technologies will become apparent to those skilled in the art.

Although not particularly mentioned in the embodiments, the measurement results of the service quality may include an SINR of the side link, a BLER of the side link, a downlink SINR of the cellular communication, a downlink BLER of the cellular communication, an uplink or downlink SINR of communication (such as Wifi) other than cellular communication, a delay until actual transmission of D2D Discovery from triggering of the transmission of the D2D Discovery, etc.

Although not particularly mentioned in the first modification, a UE 100 configured to report the measurement results of the uplink delay time to the eNB 200 may be designated by the eNB 200. For example, the eNB 200 monitors periodic voice packets received from the UE 100, and at the same time, estimates the uplink delay time based on the jitters of the periodic voice packets. The eNB 200 designates a UE 100 in which the estimated delay time is more than a threshold value as a UE 100 configured to report the measurement results of the uplink delay time.

In the embodiments, the description is provided based on a case of utilizing MDT, but the present disclosure is not limited thereto, and the measurement results of the service quality may be reported without utilizing MDT. Similarly, in the first modification, the description is provided based on a case of utilizing MDT, but the present disclosure is not limited thereto, and the measurement results of the uplink delay time may be reported without utilizing MDT.

Although not particularly mentioned in the embodiments, a program for causing a computer to execute each process performed by the UE 100 and the eNB 200 may be provided. Furthermore, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a CD-ROM and a DVD-ROM, for example.

Alternatively, a chip may be provided which is constituted of; a memory in which a program for performing each process performed by the UE 100 and the eNB 200 is stored; and a processor for executing the program stored in the memory.

In the embodiments, the LTE system is described as an example of the mobile communication system. However, the embodiments are not limited thereto. The mobile communication system may be a system other than the LTE system.

Appendix 1

1. Introduction

"Further Enhancements of Minimization of Drive Tests for E-UTRAN" is agreed. One of the key objectives is to study provision of additional feedback from UE in order to accurately reflect the channel condition for coverage and network optimization. The study item also pointed out the following objective:

Enhanced Coverage Optimization Use Case:

Consider provision of additional feedback from UE handling diverse capabilities that impact MDT measurement results (e.g. new type of assistance information such as IDC, etc) and analyze what benefit such information could achieve.

In this contribution, the impact of IDC interference to MDT measurement results and potential solutions are discussed.

2. Discussion

As part of the FeMDT study item, it should study some mechanisms which reflect the channel condition to MDT measurement results accurately. One of the typical factors that impact MDT measurement results is IDC interference. According to the TR for interference avoidance for in-device coexistence, WiFi and Bluetooth may interfere to LTE device. According to the current specification, a UE can send an IDC indication via dedicated RRC signalling to report the IDC problems to the eNB when it experiences IDC problems that it cannot solve by itself and a network intervention is required. It means eNB can detect whether IDC problem is happened or not based on InDeviceCoexIndication message if UE is CONN mode. Therefore, RAN2 don't need to study Immediate MDT case since eNB/NW can decide how to process MDT data received from specific UEs (i.e., having IDC coexistence issue) by implementation.

Observation: RAN2 should focus on how IDLE UE performs Logged MDT when it experiences IDC interference.

Figure 12:
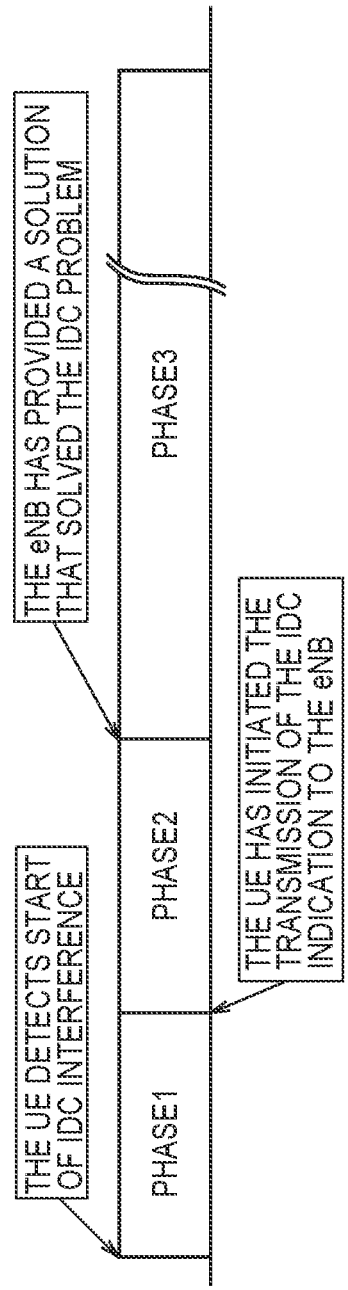
FIG. 12 is a diagram illustrating a different phase of an IDC interference-related operation by a UE according to Appendix 1.

If WiFi and Bluetooth Tx causes interference to the Rx of the LTE Radio, measurement result is polluted due to IDC interference. Since eNB/NW cannot detect whether the logged data is polluted or not, UE should log only non-polluted measurement result. Therefore, UE should stop MDT logging as soon as possible when it detects IDC interference. According to the section 23.4.2 of TS 36.300, the 3 phases of IDC interference are showed in FIG. 12.

Phase 1; The UE detects start of IDC interference but does not initiate the transmission of the IDC indication to the eNB yet.

It is proposed that the IDLE UE should stop MDT logging when it triggers Phase 1 of IDC interference situation.

Proposal 1; The IDLE UE should stop logging when it triggers the start of Phase 1 of IDC interference.

ISSUE 1; Should UEs discard "all logged data" or "only polluted data"? Then the question is whether the logged data should be discarded or not. There are 2 alternatives;

Alt 1) UE discards all logged data prior to IDC interference detection.

Alt 2) UE detects and discards only the polluted logged data.

It would be simpler if the UE just discard "all logged data". On the other hand, it's always better not to discard perfectly good logged data if it can be avoided without too much UE complexity. In the latter case, UE should stops logging but keep the non-polluted logged data when it detects IDC problem. For Alt 2, two options may be considered for the discarding of only the polluted logged data.

Option1) UE keeps all logged data prior to Phase 1.

Option2) UE discard logged data which is collected after it starts to use WiFi/Bluetooth.

Option 1 is much simpler than Option 2. However, there's a possibility that some of the logged data may already be polluted before Phase 1. This is because the Phase 1 starts from the detection of IDC interference of which the details are left up to UE implementation; According to, "The UE may rely on existing LTE measurements and/or UE internal coordination to assess the interference and the details are left up to UE implementation". Also since the detection of IDC interference is up to UE implementation, the UE may not trigger Phase 1 if the IDC interference is very minor. In other words, it may be possible that the interference is so minor (at least from the UE's perspective) that the UE never triggers Phase 1 but in fact the logged data is already somewhat polluted. In this scenario, the "polluted" logged data would be reported since IDC interference wasn't officially detected. Therefore measurement results may be polluted as soon as the UE begins to use WiFi/Bluetooth. Due to the uncertainty of the polluted state of the logged data, if Option 1 is chosen, UE should include in the log (or include in the Log Availability indication, if we use indication) that Phase 1 was detected. Then the eNB/NW could have the option to discard the entire data (or whether to retrieve the data, if indication is used) when retrieved or discard some of the data towards the end of the log. Another option would be to allow the UE to add indications in the log (e.g., time stamps) when it starts/stops the use of WiFi/Bluetooth and the eNB/NW may remove polluted measurement results from the reported log based on these indications.

In contrast to Option 1, accuracy of MDT log is increased if Option 2 is applied. However, UE complexity is increased since UE must log when it starts to use WiFi/Bluetooth for removing the polluted result completely. Note this is a complementary solution to the above option i.e., UE adds an indication such as time stamps when it starts/stops using WiFi/Bluetooth, the main difference between the two options is whether the eNB/NW is doing the filtering (Option 1) or the UE is doing the filtering (Option 2).

As a conclusion, it is considered difficult to keep only non-polluted logged data. Therefore, it prefers Alt 1 that UEs always discard all logged data when it detects the start of Phase 1 of IDC interference.

Proposal 2: UE always discard all logged data when it detects the start of Phase 1 of IDC interference.

ISSUE 2: Which UE discard the MDT configuration or store it to restart the logging when IDC problem is resolved? From UE's perspective, it is simpler if the UE would also discard the MDT configuration if Proposal 2 is agreed. However, 3GPP has been studying mechanisms that allow for eNB to offload traffic to ISM band as much as possible. If the UE discards the MDT configuration when it detects IDC interference or when WiFi or Bluetooth is used, there would be less opportunity for the NW to collect data on the LTE bands near the ISM bands. Therefore, it would be preferable if the UE keeps the MDT configuration and restart the logging after the IDC problem is resolved. The definition of "IDC issue is resolved" should be aligned with "when the UE no longer suffers from IDC problems" which is described in TS 36.300.

In case the logging needs to be restarted and there are existing log (depending on decision on Issue 1 above), there shouldn't be any problem for the UE since the UE can already handle this situation well based on the current specification which allows the following UE behaviour; if UE move IDLE=>CONN=>IDLE and Logged results are not retrieved during CONN, UE restart logged MDT and create one Logged measurement result.

Proposal 3: UE keeps the MDT configuration and restart the logging after the IDC problem is resolved.

Appendix 2

1. Introduction

As part of the FeMDT study item, one of the key objectives is the study of the enhancements needed to support the QoS of MMTEL and video traffic. The following are agreed.

Agreements:

1. Latency metrics for both UL and DL are desirable for GBR traffic

FFS: Required/desirable/affordable accuracy

According to above agreement, it's still agreeable to have UL delay measurement. However, the existing specification does not have any L2 measurement for UL delay measurement, and therefore we discuss the details about potential solutions in this contribution.

2. Discussion

Several solutions are proposed. They can be categorized into three alternatives like following.

Alt 1. eNB estimates the UL queuing delay without any assistance from UE.

Alt 2. UE tags each PDCP PDU with system time information. eNB determines the UL queuing delay using the system time information provided.

Alt 3. UE determines if UL queuing delay has exceeded a configured threshold and report data or delay related parameters to assist the eNB in determining the UL delay.

With regards to Alt 1, the eNB may monitor the periodic voice packets (e.g., every 20 ms) to determine if there are variations in receiving these packets (resulting into jitter). This alternative has a benefit that UL latency can be measured without additional complexity to UE side. Also, QoS related information is measured in the eNB which is aligned with the existing policy for L2 measurement. Furthermore, Alt 1 can be achieved based on eNB implementation which means no standardization work is needed. However, since the eNB doesn't know when the traffic arrives in UE's PDCP buffer, high measurement accuracy cannot be expected.

With regards to Alt 2, UE adds a time stamp to PDCP packet and eNB calculates the latency using the time stamp provided in association with the time the eNB successfully decodes the received PDCP packet. In contrast with Alt 1, this alternative allows for eNB to calculate accurate UL latency measurement result since eNB can use the time stamp added by UE. However, this alternative would require lots of logging and will result in excessive burden for both the UE and the eNB. Therefore, it should consider how to mitigate these complexities in SI phase. One example of implementation based procedure is the combinations of Alt 1 and 2; the eNB estimates the latency roughly using Alt 1 and requests the UE to add time stamps to the PDCP packets for specific UEs e.g., when the estimated latency or dispersion of latency (i.e., jitter) exceeds a threshold. Another possibility is for the eNB to configure a short measurement duration (e.g., 5 sec) that the PDCP packets would need to be time stamped and reported as part of MDT configuration. This would reduce the number of PDCP packets that the UE will need to measure and log during the duration time of MDT. The start time of this short measurement duration should be controlled by the eNB.

With regards to Alt 3, all the complexities reside in the UE to determine the UL latency. Since this introduces significant burden for the UE, it's essential to consider methods to minimize such complexities if Alt 3 is chosen. Alt 3 is similar to Alt 2 in that the eNB estimates the latency using Alt 1 and requests specific UEs to measure UL latency e.g., when the estimated latency or dispersion of latency exceeds a threshold. In addition, with Alt 3, it is further assumed that the UE may perform some filtering so that it only logs and reports data that exceed some delay threshold. Alternatively, it is also possible for the UE to report some delay related parameters to the eNB so that the eNB may compute the dispersion of latency. Possible delay related parameters to be reported include e.g., "the number of measured PDCP SDU" with average, x %, y % worst/best latency measurement results.

Proposal 1: RAN2 should capture above three alternatives with possible enhancements in TR as candidate solutions.

Proposal 2: RAN2 should study methods to minimize both UE and eNB/NW complexities and capture them in TR for the case UE based solution is introduced.

Appendix 3

Introduction

A new WI "Further Enhancements of Minimization of Drive Tests for E-UTRAN" was approved. The work item includes the following objective:

Enhanced QoS Verification Use Case:

Specify MDT measurements and procedures to support better understanding of the QoS and its limiting factors for MMTEL voice and video traffic, including:

1. UL PDCP queuing delay measurement
2. Data loss measurement for UL and DL (except for UL dropping of PDCP SDUs)
3. Traffic drop metric collection The following are agreed.

The UL PDCP queuing delay measurement should be performed on a per QCI basis for each UE and the packet delay observed only at the PDCP layer of the UE (from the packet arrival at the PDCT upper SAP until the packet begins to be delivered to the RLC) should be reflected.

Discussion

Necessity of Location Information

According to some documents, the cause of UL queueing delay is a scheduling. If the reported UL queueing measurements are not acceptable, it is straightforward to assume that the NW would modify the scheduling algorithm to reduce the delay; otherwise, the queueing delay may persist. In our understanding, if the result of the queueing delay measurement is only used to eNB, it may be not necessary to report queueing delay measurement with location information. On the other hand, location information is useful for the TCE to detect the root cause of queueing delay. For example, TCE can determine that the root cause of the problem is scheduling if excessive queueing delay occurs under good DL and UL coverage, Note TCE may acquire both DL and UL coverage information from the existing MDT measurement results. Therefore, it prefers location information should be reported even for queueing delay measurement.

Proposal 1; Location information should be reported with UL PDCP queueing delay measurement result.

Immediate MDT or Logged MDT in Connected

Another point to consider is which type of processing, immediate MDT or Logged MDT in Connected should be applicable to UL PDCP queueing delay measurements. If RAN2 decides that only the UL PDCP queueing delay measurement is sufficient, then Immediate MDT is not necessary since the root cause of the problem may be due to scheduling. That means queueing delay cannot be improved until the scheduling algorithm is modified. Assuming the NW does not update the scheduling algorithm frequently, it believes there is no benefit for the NW to obtain the queueing delay measurements in real-time. If so, Logged MDT in Connected, which is already standardized in Rel-12, is preferable since it has less signaling overhead and both UE and NW complexity may be reduced. With Immediate MDT, the NW may need to piece together many fragments of reported measurements in order to evaluate the extent of the problem.

However, the existing Immediate MDT is designed to allow the eNB to directly use the reported measurements. For example, the eNB may update radio parameter to adjust to the UE's changing conditions. As mentioned in previous section, there is a possibility that eNB/NW can estimate total UL delay based on UL PDCP queueing delay measurement. If the total UL latency of a specific service goes beyond the expected threshold, eNB/NW should have the option to e.g., update radio parameter as soon as possible for fulfilling the QoS for the intended service. From this perspective, it prefers that Immediate MDT be applied to PDCP queueing delay measurement reporting.

Proposal 2: Immediate MDT is applied to PDCP queueing delay measurement reporting.

Measurement Configuration and Report Mechanism

If proposal 2 is agreed, it should also consider if the UE should report all measurement results or specific measurement results e.g., exceeding the delay threshold. It prefers the latter since delay spikes are the main cause for concern for both UE and eNB vendors, according to the result of the study of UL delay measurement. Therefore, the UE should begin reporting the UL PDCP queueing delay measurement results exceeding a configured delay threshold and stop reporting after measurements falls below a configured delay threshold. It is FFS if hysteresis needs to be applied for the entering and the leaving conditions. Regarding the delay threshold, we think it should be configurable by eNB/NW e.g., using the UL PDCP queueing delay measurement configuration.

Proposal 3: UE should begin reporting the UL PDCP queueing delay measurement results exceeding a configured delay threshold and stop reporting when the UL PDCP queueing delay measurements falls below a configured delay threshold.

Necessity for Acquiring the UL PDCP Delay Characteristic

If proposal 3 is agreed, NW can only acquire the UL PDCP queueing delay measurement results exceeding the configured threshold. Therefore, if the UL PDCP delay characteristic needs to be corrected by the NW, additional assistance information should be provided by the UE. It is understood that one of the main objectives for network optimization is to keep jitter and average latency within the limits appropriate for the application, esp. for GBR type traffic.

It considers that at least the number of measured UL PDCP SDUs and the average UL PDCP queueing delay are needed for the NW to estimate UL PDCP delay characteristic. If so, UE should calculate average UL PDCP queueing delay and report it with the number of measured UL PDCP SDUs at a later time. Therefore, the eNB should have the option to request the UE to calculate average UL PDCP queueing delay using the UL PDCP queueing delay measurement configuration. Since the information is already statistical, there's no need for the UE to report location information of measurement samples.

Proposal 4: The eNB should have the option to request the UE to calculate the average UL PDCP queueing delay using the UL PDCP queueing delay measurement configuration.

Proposal 5: If requested, UE should calculate the average UL PDCP queueing delay and report it with the number of measured UL PDCP SDUs at a later time.

The User Equipment (UE) reports location information with an Uplink PDCP queueing delay measurement results measured at the UE to eNB/Network.

The User Equipment (UE) reports an Uplink PDCP queueing delay measurement results measured at the UE to eNB/Network by immediate MDT.

The User Equipment (UE) reports an Uplink PDCP queueing delay measurement results exceeding the delay threshold, and stops the Uplink PDCP queueing delay measurement reporting after measurement result falls under the threshold.

In this case, the delay threshold is configured from the eNB/Network to the UE.

The User Equipment (UE) calculate the average UL PDCP queueing delay, and the calculation of average UL PDCP queueing delay is requested from the eNB/Network to the UE at the UL PDCP queueing delay measurement configuration.

The User Equipment (UE) report average UL PDCP queueing delay measurement result with the number of measured UL PDCP SDUs at a later time.

In this case, the UE report measurement result by the request from the eNB/Network.

Appendix 4

1. Introduction

Measurement configuration and reporting mechanism for UL PDCP queueing delay under the FeMDT work item are discussed. Ii is considered that UE behaviour when no spikes are detected is still FFS. In this appendix, this issue and candidates how to modify the specifications are discussed.

2. Discussion

2.1. EXCESS DELAY RATIO Measurement Report Mapping

It is agreed that the UE shall report UL PDCP SDU queueing delay as the ratio of SDUs exceeding the configured delay threshold and the total number of SDUs received by the UE during the measurement period. The mapping of measured quantity is defined in Table 4.2.1.1.1-1 of TS 36.314 as follows:

TABLE 1

Table 4.2.1.1.1-1: EXCESS DELAY RATIO measurement report mapping (5-bit value)

| Reported value | Measured quantity value | Unit |
| --- | --- | --- |
| EXCESS DELAY RATIO_00 | EXCESS DELAY RATIO < 0.079 | % |
| EXCESS DELAY RATIO_01 | 0.079 < EXCESS DELAY RATIO < 0.100 | % |
| EXCESS DELAY RATIO_02 | 0.100 < EXCESS DELAY RATIO < 0.126 | % |
| ... | ... | ... |
| EXCESS DELAY RATIO_30 | 63.096 < EXCESS DELAY RATIO < 79.433 | % |
| EXCESS DELAY RATIO_31 | 79.433 < EXCESS DELAY RATIO < 100 | % |

It is considered that this table should be updated since UE could not detect the reported value if the measured quantity value is just on the border (e.g., 0.079). For taking the case all packets' latency excess the configured threshold into account, the right "greater than sign" should be changed to "greater than equal to sign". Therefore, our proposal is to update the table as;

TABLE 2

Table 4.2.1.1.1-1: EXCESS DELAY RATIO measurement report mapping (5-bit value)

| Reported value | Measured quantity value | Unit |
| --- | --- | --- |
| EXCESS DELAY RATIO_00 | EXCESS DELAY RATIO ≤ 0.079 | % |
| EXCESS DELAY RATIO_01 | 0.079 < EXCESS DELAY RATIO ≤ 0.100 | % |
| EXCESS DELAY RATIO_02 | 0.100 < EXCESS DELAY RATIO ≤ 0.126 | % |
| ... | ... | ... |
| EXCESS DELAY RATIO_30 | 63.096 < EXCESS DELAY RATIO ≤ 79.433 | % |
| EXCESS DELAY RATIO_31 | 79.433 < EXCESS DELAY RATIO ≤ 100 | % |

Proposal 1; The right "greater than sign" of Table 4.2.1.1.1-1 in TS 36.314 should be replaced to "greater than equal to sign".

2.2. UL PDCP Delay Measurement Reporting when No Spikes are Detected

It is agreed that the measurement result is converted into a ratio of packet delays exceeding a configured threshold and the total number of packets during the measurement/reporting period.

Agreements

In case the number of PDCP SDUs and/or detected events will be reported, the coding of the numbers or ratio shall re-use the coding principles of those defined for MBSFN BLER reporting.

For this agreement, it is understood that UE can report UL PDCP queueing delay measurement results only when the event is detected (i.e., spikes are detected by the UE). According to the result of the study of UL delay measurement, the delay spikes are the main cause for concern for both the UE and the eNB. Therefore, there isn't much point in reporting of PDCP queueing delay measurement result if no spikes are detected by the UE within the measurement/reporting period. Since the UL PDCP queueing delay measurement reporting is periodical, NW can understand there are no spikes in the measurement/reporting period if NW don't receive the measurement result. Furthermore, if the UE is required to report all measurements regardless of the detection of delay spikes there could be excessive amounts of reporting with no spikes if spikes are not expected.

If UE doesn't report the UL PDCP queueing delay measurement result when no spikes are detected, RAN2 should discuss how this agreement is captured in the specifications. According to the TS 36.331, the trigger of UL PDCP queueing delay measurement report is the following:
1>if there is ul-PDCP-DelayResult available:
2>set the ul-PDCP-DelayResult to the received value;
where ul-PDCP-DelayResult is constructed from excessDelay and qci-Id. excessDelay is referenced to the aforementioned table in TS 36.314.

It is considered that one possibility to prevent reporting of UL PDCP delay measurements when excessive delay is not detected is to modify the mapping of the EXCESS DELAY Ratio so that

TABLE 3

| EXCESS DELAY RATIO_00 | EXCESS DELAY RATIO < 0.079 | % | is changed to:

TABLE 4

| EXCESS DELAY RATIO_00 | 0 < EXCESS DELAY RATIO ≤ 0.079 | % |

This means ul-PDCP-DelayResult is not created if the UE does not detect any UL PDCP delay based on the delay threshold. In addition, it is considered that it would be good to capture in Stage 2 that the UE does not report UL delay when no delay spike is detected. Perhaps a "NOTE" could be added as follows in section 5.2.1.1 of TS 37.320 under Measurements—M6:

NOTE: If the UE does not detect any UL PDCP delay based on the delay threshold and delay report interval configured by the network, the UE does not report any UL PDCP delay measurement within that period.

Appendix 5

UE-Based QoS Measurement

Basic Assumption
  One-to-one D2D communication using ACK/NACK is introduced.
  For side link QoS measurement only mode 1 communication is assumed.
  Measurement identification information
    Side link data loss
    Side Link Scheduled IP Throughput
    Side link data volume
    Side link packet delay/uplink packet delay
    Downlink SINR/(for further study) side link SINR/WLAN downlink SINR
    Downlink BLER/(for further study) side link BLER/WLAN downlink BLER
  Possible reporting trigger
    Periodic
    Event
      Per each PDCP SDU
        A Qos measurement result is worse than the threshold
  Possible IEs of measurement configurations
    Measurement target (optional)
      Data Loss, Scheduled IP Throughput, Data Volume, Packet Delay, etc
    Reporting/logging triggers
      Periodically, per PDCP SDU, a result is less than the threshold, etc MDT for the UE-Based QoS Measurement Immediate MDT
  Configuration
  Reuse the existing RRM measurement configuration with introducing new IEs for UE based QoS measurement. This may be achieved by "add-ons" to the existing RRM measurement configurations.
  Reporting method and log available indication
  Per reporting triggers without any available indication
Logged MDT in Connected
  Configuration
  Reuse the existing logged measurement configuration with introducing new IEs for UE based QoS measurements. This can be achieved by "add-ons" to the existing logged measurement configurations.
  Reporting method and log available Indication
  Alt 1: From IDLE to CONN (and per HO as optional)
  Alt 2: No available indication (up to eNB implementation)
  Note: For the case Logged MDT, the number of PDCP SDU, averaged QoS measurement result and some other results like (Optional) 95% worst QoS measurement results and (Optional) 5% worst one.

Measurement Identities

Side Link Data Loss

Packet loss rate in the side link per QCI. This measurement refers to packet loss for the DRBs. One packet corresponding to one PDCP SDU. The reference point is PDCP upper SAP. The measurement is done separately per QCI.

Detailed Definition $$M(T, qci) = \left\lfloor \frac{Dloss(T, qci) * 1000000}{N(T, qci)} \right\rfloor \quad \text{[Equation 1]}$$

TABLE 5

Table 4.1.5.3-1

| | |
|---|---|
| M (T, qci) | Packet Loss Rate in the Side link per QCI. Unit: number of lost packets per transmitted packet * $10^6$, Integer. |
| Dloss (T, qci) | Number of missing Side link PDCP sequence numbers, representing packets that are not delivered to higher layers, of a data radio bearer with QCI = qci during time period T. If transmission of a packet might continue in another cell, it shall not be included in this count. |
| N (T, qci) | Total number of Side link PDCP sequence numbers (also including missing sequence numbers) of fa bearer with QCI = qci, starting from the sequence number of the first packet delivered by PDCP upper SAP to the higher layers until the sequence number of the last packet during the time period T. |
| T | Time period during which the measurement is performed, Unit: minutes. |

Side Link IP Throughput

Scheduled IP throughput for MDT on side link. ENB of the throughput of the PDCP SDU bits in the side link for data bursts large enough to request that the transmission be split over several TTIs by excluding the data to be transmitted during the last TTI of the data burst Estimate. Only the data transmission time, that is, only when the data transmission via the side link has started but has not yet ended is considered. Measurement is performed for each D 2 D UE. For successful reception, the reference point is MAC upper SAP.

This measurement is obtained by the following formula for the measurement period.

$$\text{If} \sum ThpTimeSl > 0, \frac{\sum ThpVolSl}{\sum ThpTimeSl} \times 1000 \text{ [kbits/s]} \quad \text{[Equation 2]}$$

$$\text{If} \sum ThpTimeSl = 0, 0 \text{ [kbits/s]}$$

TABLE 6

Table 4.1.7.2-1

| | |
|---|---|
| ThpTimeSl | If the data burst is small enough to be transmitted during one TTI, then ThpTimeSl = 0. Otherwise, ThpTimeSl = T1 − T2 [ms]. |
| T1 | If transmission of a data burst is ongoing at the end of the measurement period, then T1 is the pint in time when the measurement period ends. Otherwise, T1 is the point in time when the last TTI for transmission of the data burst begins. |
| T2 | If transmission of a data burst is ongoing at the start of the measurement period, T2 is the point in time at when the measurement period begins. Otherwise, T2 is the point in time when the first TTI used for transmission of the data burst begins. |
| ThpVolSl | The data volume counted on the PDCP SDU level in kbits received in the Side link for the data burst excluding the data volume received in the last TTI used for transmission of the data burst. |

Side Link Data Volume

Data volume for MDT in side link. Amount of PDCP SDU bits successfully received by one D2D UE in the side link during the measurement period. Measurement is performed for each D2D UE per QCI. The unit is kbits.

Side Link Packet Delay/Uplink Packet Delay

Packet delay on side link/uplink per QCI. This measurement refers to the packet delay for the DRB. For packet arrival, the reference point is PDCP upper SAP. For successful reception, the reference point is MAC Lower SAP. Measurements are made separately for each QCI.

Detailed Definition $$M(T, qci) = \left\lfloor \frac{\sum_{\forall i} tAck(i) - tArriv(i)}{I(T)} \right\rfloor \quad \text{[Equation 3]}$$

TABLE 7

Table 4.1.4.1-1

| | |
|---|---|
| M (T, qci) | Packet Delay in Side link/Uplink per QCI, averaged during time period T. Unit: integer ms. |
| tArriv (i) | The point in time when PDCP SDU i arrives. |
| tAck (i) | The point in time when the last PDCP SDU i was received by the D2D UE/UE according to received HARQ feedback information. |
| i | A PDCP SDU arrives at the PDCP upper SAP during time period T. PDCP SDU for which HARQ acknowledgments is not received for all parts shall not be included in the calculation. |
| I (T) | Total number of PDCP SDU i. |
| T | Time period during which the measurement is performed |

MDT for the UE-Based QoS Measurement

Flowchart

Figure 13:
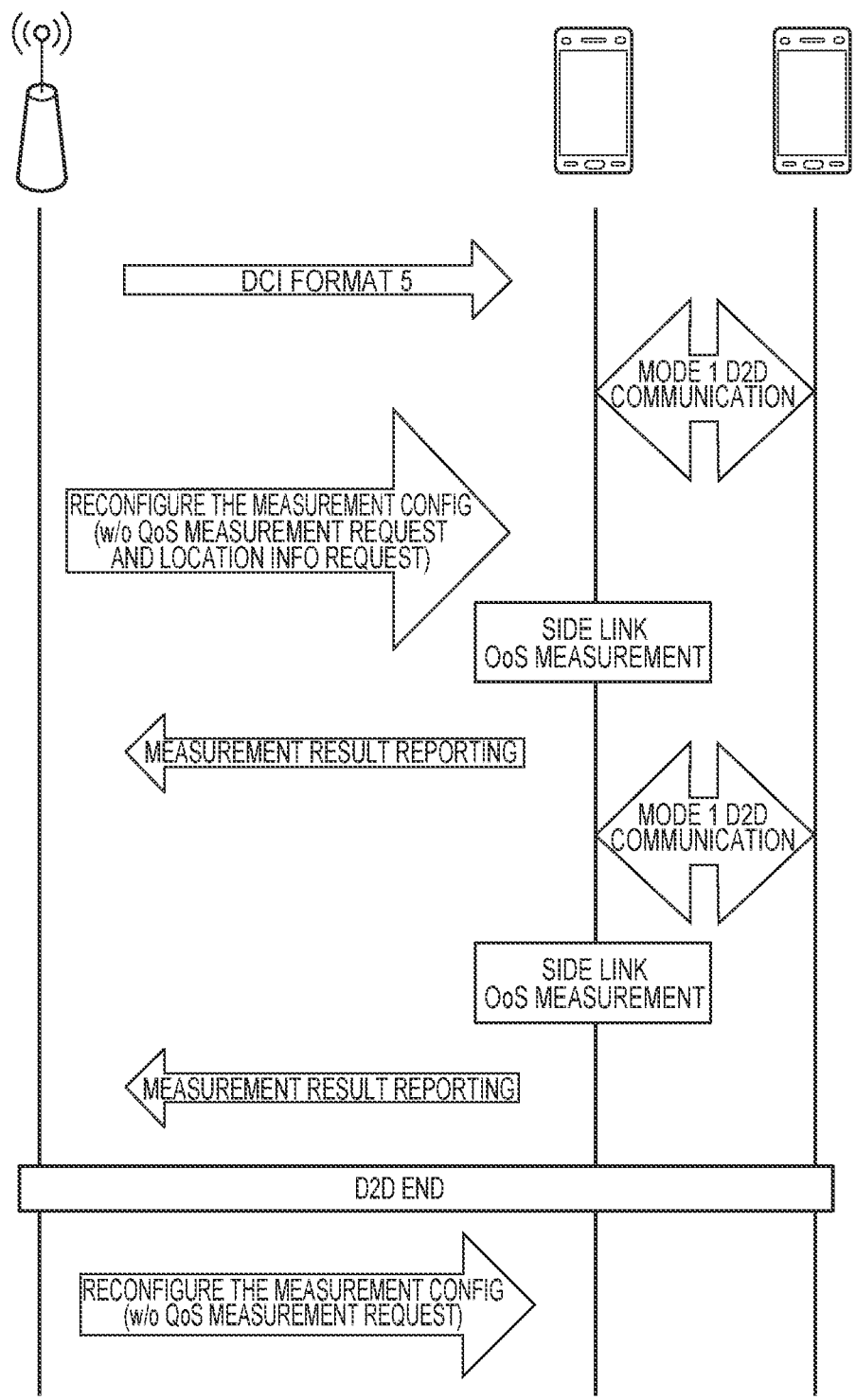
FIG. 13 is a sequence diagram illustrating Immediate MDT according to Appendix 5.

Immediate MDT
FIG. 13 illustrates a flowchart of this case.
Note: The eNB may notice the D2D termination based on the UE's BSR.
Logged MDT in Connected
Alt 1: From IDLE to CONN (and per HO as optional)

Can reuse the existing Logged MDT in Connected procedure.

Figure 14:
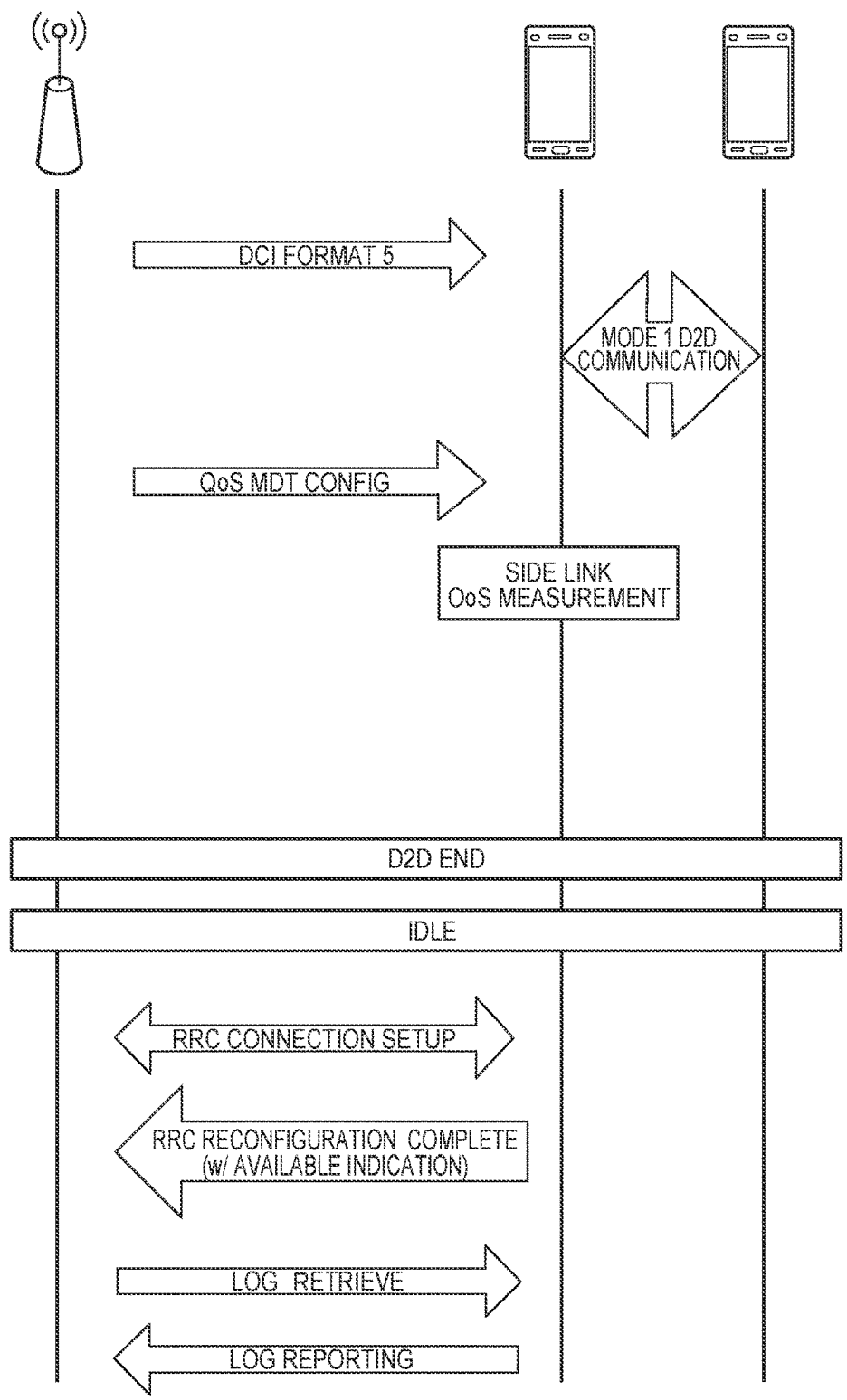
FIG. 14 is a sequence diagram illustrating Logged MDT in Connected according to Appendix 5.

FIG. 14 illustrates a flowchart of this case.

Alt 2: No available indication (up to eNB implementation)

Since the eNB may notice the D2D end based on the BSR of the UE, the eNB can retrieve the QoS measurement log after the D2D communication is completed.

INDUSTRIAL APPLICABILITY

The present application is useful in the field of communication.

The invention claimed is:

1. A user terminal in a Radio Resource Control (RRC) connected state with a radio base station and configured to perform cellular communication with the radio base station, the user terminal comprising:
 a receiver configured to receive, configuration information configuring measurement for a queuing delay of data packet in an uplink, from the radio base station in a dedicated manner;
 a controller configured to measure the queuing delay of data packet in the uplink between the user terminal and the radio base station; and
 a transmitter configured to report a result of the measurement to the radio base station, wherein
 the configuration information includes threshold information indicating a threshold related to the queuing delay,
 the transmitter is configured to report the result of the measurement upon measuring the queuing delay exceeding the threshold,
 the controller is configured to determine whether an in-device interference is detected during the measurement of the queuing delay, the in-device interference being caused by a predetermined communication other than the cellular communication performed between the user terminal and the radio base station, and
 the transmitter is configured to prevent reporting of the result of the measurement upon determining that the in-device interference is detected during the measurement of the queuing delay.

2. The user terminal according to claim 1, wherein the controller is further configured to notify the radio base station of the in-device interference upon determining that the in-device interference is detected during the measurement of the queuing delay.

3. The user terminal according to claim 1, wherein the predetermined communication includes at least one of Wi-Fi communication and a Bluetooth communication.

4. The user terminal according to claim 1, wherein the controller is further configured to resolve the in-device interference detected during the measurement of the queuing delay, and
 the transmitter is configured to report a result of the measurement obtained after the in-device interference is resolved.

5. A communication method comprising:
 performing cellular communication between a user terminal and a radio base station;
 transmitting in a dedicated manner, from the radio base station to the user terminal in a Radio Resource Control (RRC) connected state with the radio base station, configuration information configuring measurement for a queuing delay of data packet in an uplink, the configuration information including threshold information indicating a threshold related to the queuing delay;
 measuring the queuing delay of data packet in the uplink between the user terminal and the radio station, by the user terminal;
 reporting, by the user terminal, a result of the measurement to the radio base station; and
 determining, by the user terminal, whether an in-device interference is detected during the measurement of the queuing delay, the in-device interference being caused by a predetermined communication other than the cellular communication performed between the user terminal and the radio base station, wherein
 the reporting the result of the measurement comprises
 reporting the result of the measurement upon measuring the queuing delay exceeding the threshold, and
 preventing reporting of the result of the measurement upon determining that the in-device interference is detected during the measurement of the queuing delay.

6. An apparatus provided in a user terminal in a Radio Resource Control (RRC) connected state with a radio base station, comprising:
 a processor and a memory communicatively coupled to the processor, the processor configured to execute the processes of:
 performing cellular communication with the radio base station;
 receiving configuration information configuring measurement for a queuing delay of data packet in an uplink, from the radio base station in a dedicated manner, the configuration information including threshold information indicating a threshold related to the queuing delay;
 measuring the queuing delay of data packet in the uplink between the user terminal and the radio base station;
 reporting a result of the measurement to the radio base station; and
 determining whether an in-device interference is detected during the measurement of the queuing delay, the in-device interference being caused by a predetermined communication other than the cellular communication performed between the user terminal and the radio base station, wherein
 the process of reporting comprises processes of:
 reporting the result of the measurement upon measuring the queuing delay exceeding the threshold, and
 preventing reporting of the result of the measurement upon determining that the in-device interference is detected during the measurement of the queuing delay.

* * * * *